(12) United States Patent
Fukuoka et al.

(10) Patent No.: US 11,983,022 B2
(45) Date of Patent: May 14, 2024

(54) TRAVEL ROUTE CREATION SYSTEM

(71) Applicant: WHILL, Inc., Tokyo (JP)

(72) Inventors: Muneaki Fukuoka, Tokyo (JP);
Shunsuke Katsumata, Tokyo (JP)

(73) Assignee: WHILL, Inc., Tokyo (JP)

( * ) Notice: Subject to any disclaimer, the term of this patent is extended or adjusted under 35 U.S.C. 154(b) by 721 days.

(21) Appl. No.: 17/110,696

(22) Filed: Dec. 3, 2020

(65) Prior Publication Data

US 2021/0089037 A1 Mar. 25, 2021

Related U.S. Application Data

(63) Continuation of application No. PCT/JP2019/035585, filed on Sep. 10, 2019.

(30) Foreign Application Priority Data

Sep. 11, 2018 (JP) .................................. 2018-169678

(51) Int. Cl.
*G05D 1/435* (2024.01)
*A61G 5/04* (2013.01)
(Continued)

(52) U.S. Cl.
CPC ............... *G05D 1/435* (2024.01); *A61G 5/04* (2013.01); *B60W 40/076* (2013.01); *G01C 21/20* (2013.01); *G01C 21/34* (2013.01); *G05D 1/0212* (2013.01); *G05D 1/0214* (2013.01); *G05D 1/0274* (2013.01); *G05D 1/639* (2024.01); *B60W 2552/15* (2020.02); *B60W 2552/35* (2020.02)

(58) Field of Classification Search
CPC .. G05D 1/0212; G05D 1/0214; G05D 1/0274; G05D 2201/0206; G05D 1/435; G05D 1/639; A61G 5/04; B60W 40/076; B60W 2300/38; B60W 2552/15; B60W 2552/35; G01C 21/20; G01C 21/34
See application file for complete search history.

(56) References Cited

U.S. PATENT DOCUMENTS

2002/0073566 A1  6/2002  Suzuki et al.
2007/0152427 A1*  7/2007  Olsen ..................... B60L 15/20
                                            280/649
(Continued)

FOREIGN PATENT DOCUMENTS

JP  2001-175846 A  6/2001
JP  2002-188910 A  7/2002
(Continued)

OTHER PUBLICATIONS

Translation of JP-2018112579-A, 9 pages (Year: 2018).*
(Continued)

*Primary Examiner* — Dale W Hilgendorf
(74) *Attorney, Agent, or Firm* — Maier & Maier, PLLC

(57) ABSTRACT

A travel route creation system which creates a travel route for a personal mobility vehicle, the system including a controller configured to create the travel route in which an entering angle to a bump or a slope is set within an angle range of 45° and more based on map data indicating the bump or the slope which the personal mobility vehicle can travel over, when creating the travel route for the personal mobility vehicle to pass the bump or the slope.

5 Claims, 18 Drawing Sheets

(51) Int. Cl.
*B60W 40/076* (2012.01)
*G01C 21/20* (2006.01)
*G01C 21/34* (2006.01)
*G05D 1/00* (2024.01)
*G05D 1/639* (2024.01)

(56) References Cited

U.S. PATENT DOCUMENTS

| | | | |
|---|---|---|---|
| 2014/0018994 A1* | 1/2014 | Panzarella | G05D 1/0248 |
| | | | 701/25 |
| 2014/0307247 A1 | 10/2014 | Zhu et al. | |
| 2014/0324266 A1 | 10/2014 | Zhu et al. | |
| 2014/0333468 A1 | 11/2014 | Zhu | |
| 2014/0336935 A1 | 11/2014 | Zhu et al. | |
| 2015/0168556 A1 | 6/2015 | Zhu et al. | |
| 2016/0057921 A1* | 3/2016 | Pickett | G05D 1/0212 |
| | | | 701/41 |
| 2017/0176641 A1 | 6/2017 | Zhu et al. | |
| 2017/0259811 A1* | 9/2017 | Coulter | B60L 15/10 |
| 2018/0011493 A1* | 1/2018 | Terada | G05D 1/0214 |
| 2018/0151066 A1 | 5/2018 | Oba | |
| 2018/0157262 A1 | 6/2018 | Ao et al. | |
| 2018/0245922 A1* | 8/2018 | Zaphir | G01C 21/005 |
| 2019/0179052 A1 | 6/2019 | Zhu et al. | |
| 2019/0208695 A1* | 7/2019 | Graf Plessen | A01B 69/008 |
| 2019/0216661 A1* | 7/2019 | Arai | G01C 21/3461 |

FOREIGN PATENT DOCUMENTS

| | | | | |
|---|---|---|---|---|
| JP | 2002-341939 A | | 11/2002 | |
| JP | 2003-010257 A | | 1/2003 | |
| JP | 2003010257 A | * | 1/2003 | G01C 21/00 |
| JP | 2003245310 A | | 9/2003 | |
| JP | 2006194795 A | | 7/2006 | |
| JP | 2007-155504 A | | 6/2007 | |
| JP | 2007-155568 A | | 6/2007 | |
| JP | 2014-215231 A | | 11/2014 | |
| JP | 2016027456 A | | 2/2016 | |
| JP | 2017-041070 A | | 2/2017 | |
| JP | 2017-052299 A | | 3/2017 | |
| JP | 2017-110994 A | | 6/2017 | |
| JP | 2017-188164 A | | 10/2017 | |
| JP | 2017-194487 A | | 10/2017 | |
| JP | 2017-215653 A | | 12/2017 | |
| JP | 2018005771 A | | 1/2018 | |
| JP | 2018-049521 A | | 3/2018 | |
| JP | 2018-091711 A | | 6/2018 | |
| JP | 2018-112579 A | | 7/2018 | |
| JP | 2018112579 A | * | 7/2018 | G01C 21/26 |
| JP | 2019056674 A | | 4/2019 | |
| KR | 20180020270 A | * | 2/2018 | A61G 5/04 |
| WO | 2007079346 A2 | | 7/2007 | |
| WO | 2014011992 A2 | | 1/2014 | |
| WO | 2014/168851 A1 | | 10/2014 | |
| WO | 2017/029775 A1 | | 2/2017 | |

OTHER PUBLICATIONS

Translation of JP-2003010257-A, 11 pages (Year: 2003).*
Translation of KR-20180020270-A, 9 pages (Year: 2018).*
International Search Report issued on Dec. 10, 2019 of corresponding application No. PCT/JP2019/035585; 5 pgs.
T. Ikeda, et al., "Wheel Model Considering Ability of Climbing Step by Approach Angle," No. 10-4 Proceedings of the 2010 JSME Conference on Robotics and Mechatronics, Asahikawa, Japan, Jun. 13-16, 2010, The Japan Society of Mechanical Engineers.
Extended European Search Report issued May 6, 2022 in Application No. 19860371.4-1009/3851800 PCT/JP2019035585; 8 pages.
Office Action issued on Oct. 17, 2023, in corresponding Japanese Application No. 2020-546042, 12 pages.

* cited by examiner

TRAVEL ROUTE CREATION SYSTEM

CROSS-REFERENCE TO RELATED APPLICATIONS

This is a continuation of International Application PCT/JP2019/035585, claiming priority to Japanese patent application No. 2018-169678 filed on Sep. 11, 2018, with the international filing date of Sep. 10, 2019, which is hereby incorporated by reference herein in their entirety.

FIELD

The present invention relates to a travel route creation system.

BACKGROUND

There are well-known automobile control systems that are provided with map data of roads on which automobiles can travel and determine the lane on which an automobile should travel when the road on which the automotive is traveling has a plurality of lanes, thus performing partially autonomous automotive travel control (refer to, for example, Japanese Unexamined Patent Application, Publication No. 2018-91711).

SUMMARY

A first aspect of the present invention is a travel route creation system which creates a travel route for a personal mobility vehicle, the travel route creation system includes a controller configured to create the travel route for the personal mobility vehicle based on first map data indicating an area in which the personal mobility vehicle can travel and second map data including information about safety during traveling or a standstill of the personal mobility vehicle.

A second aspect of the present invention is a travel route creation system which creates a travel route for a personal mobility vehicle, the travel route creation system includes: a server configured to set a plurality of passing points, which are apart from one another, between a current position of the personal mobility vehicle and a destination at least based on map data indicating an area in which the personal mobility vehicle can travel, information on the current position of the personal mobility vehicle, and information on the destination; a sensor provided in the personal mobility vehicle; and a controller configured to receive information about the plurality of passing points from the server and to create travel routes between the plurality of passing points by using data obtained by the sensor so as to pass, one after another, the passing points or the vicinities thereof.

A third aspect of the present invention is a travel route creation system which creates a travel route for a personal mobility vehicle, the travel route creation system including a controller configured to create the travel route in which an entering angle to a bump or a slope is set within an angle range of 45° and more based on map data indicating the bump or the slope which the personal mobility vehicle can travel over, when creating the travel route for the personal mobility vehicle to pass the bump or the slope.

DETAILED DESCRIPTION OF EMBODIMENTS

Figure 1:
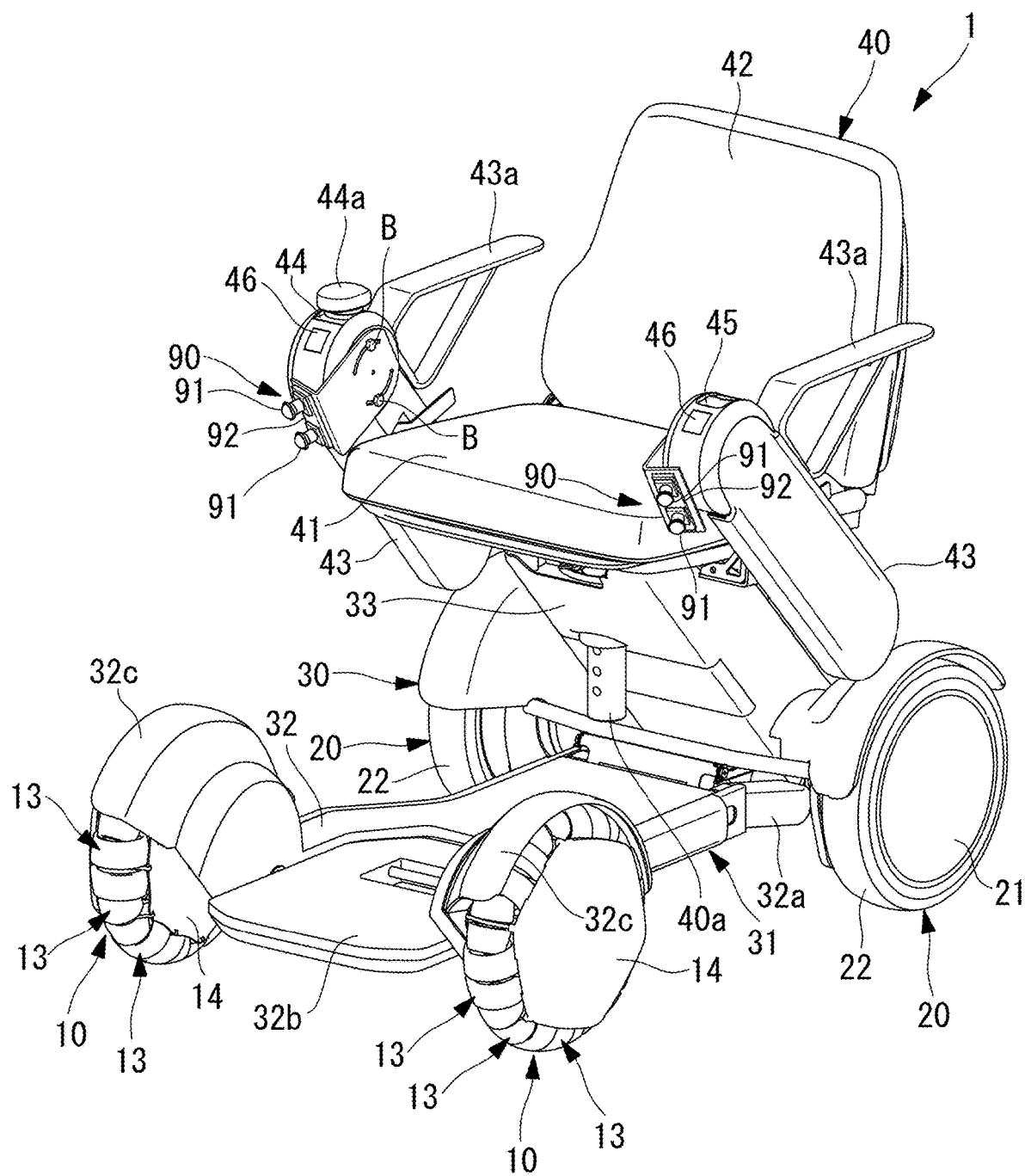
FIG. 1 is a front perspective view of a personal mobility vehicle used in a travel route creation system according to an embodiment of the present invention.
Figure 2:
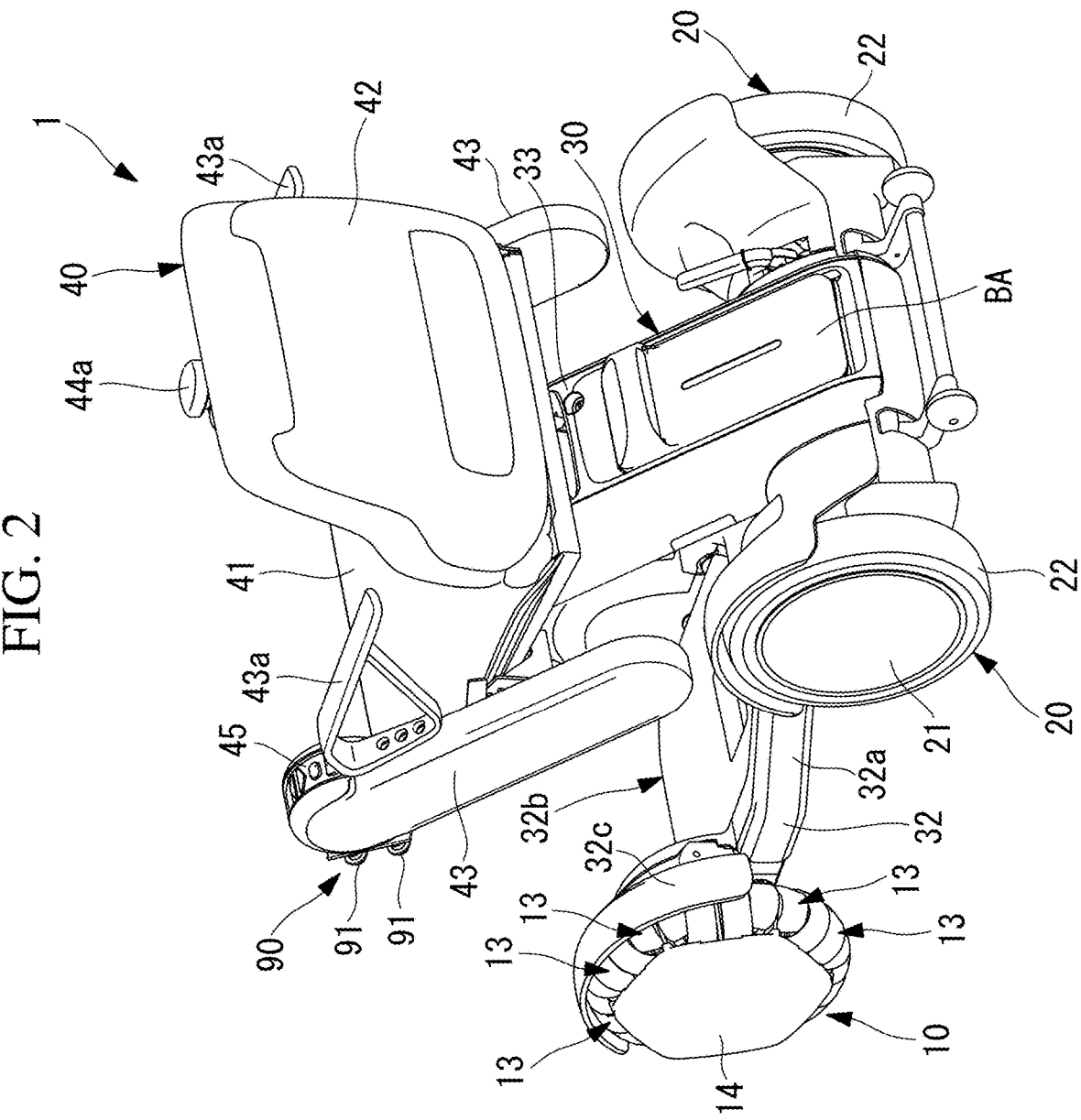
FIG. 2 is a rear perspective view of the above-described personal mobility vehicle in this embodiment.

A travel route creation system for a personal mobility vehicle (an electric mobility vehicle) 1 according to an embodiment of the present invention will be described below with reference to the accompanying drawings.

The travel route creation system is provided with a server 100, and a controller 80 which is provided in a control unit 60 of the personal mobility vehicle 1 and which is communicable with the server 100.

As shown in FIGS. 1 to 4, this personal mobility vehicle 1 includes, in an example, a pair of front wheels 10, a pair of rear wheels 20, and a mobility body 30 which is supported by the front wheels (wheels) 10 and the rear wheels (wheels) 20. For example, the mobility body 30 has a body 31 which is supported by the front wheels 10 and the rear wheels 20, a seat unit 40 which is attached to the body 31, and motors 50 which are attached to the mobility body 30, and which drive at least one of the pair of front wheels 10 or the pair of rear wheels 20. In this embodiment, the motors 50 are attached to the body 31, and the seat unit 40 is removable from the body 31. The personal mobility vehicle is a mobility vehicle on which one person sits to ride on the personal mobility vehicle.

Figure 3:
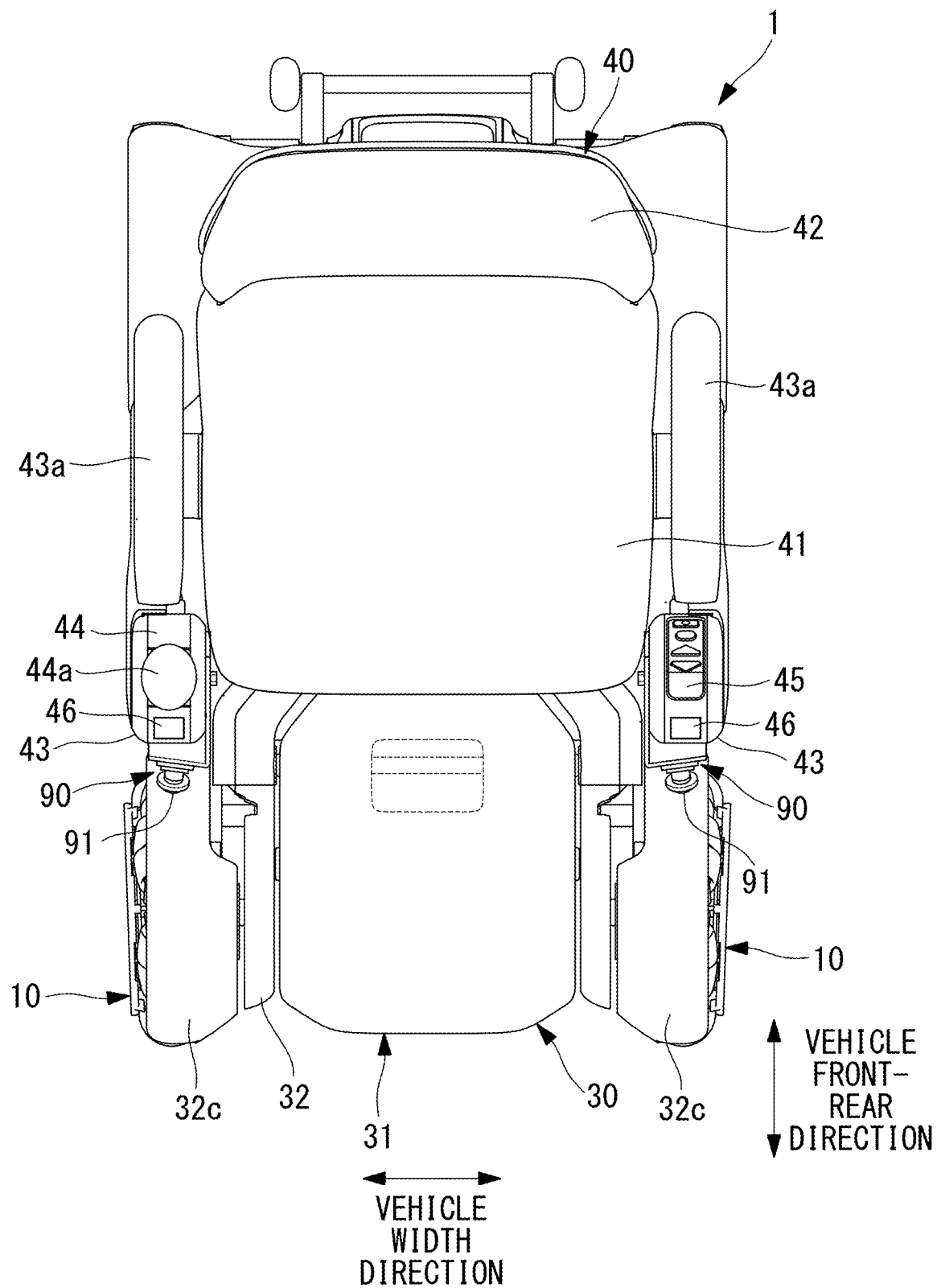
FIG. 3 is a plan view of the above-described personal mobility vehicle in this embodiment.

A vehicle front-rear direction shown in FIGS. 3 and 4 may be referred to as a front-rear direction in the following description, and a vehicle width direction shown in FIGS. 3 and 4 may be referred to as a width direction or left-right direction in the following description. Note that, the vehicle front-rear direction and the front-rear direction of the mobility body 30 are identical with each other, and the vehicle width direction and the width direction of the mobility body 30 are identical with each other. In this embodiment, the radial centers of the pair of front wheels 10 are arranged in the vehicle width direction, and the radial centers of the pair of rear wheels 20 are also arranged in the vehicle width direction, and also the vehicle front-rear direction is orthogonal to the vehicle width direction.

In this embodiment, the pair of rear wheels 20 are respectively connected to the motors 50, and each of the motors 50 drives corresponding rear wheels 20. Driving force of the motors 50 may be transmitted to the corresponding front wheels 10 via a driving force transmitting means. The driving force transmitting means is a belt, gear, or the like.

Figure 4:
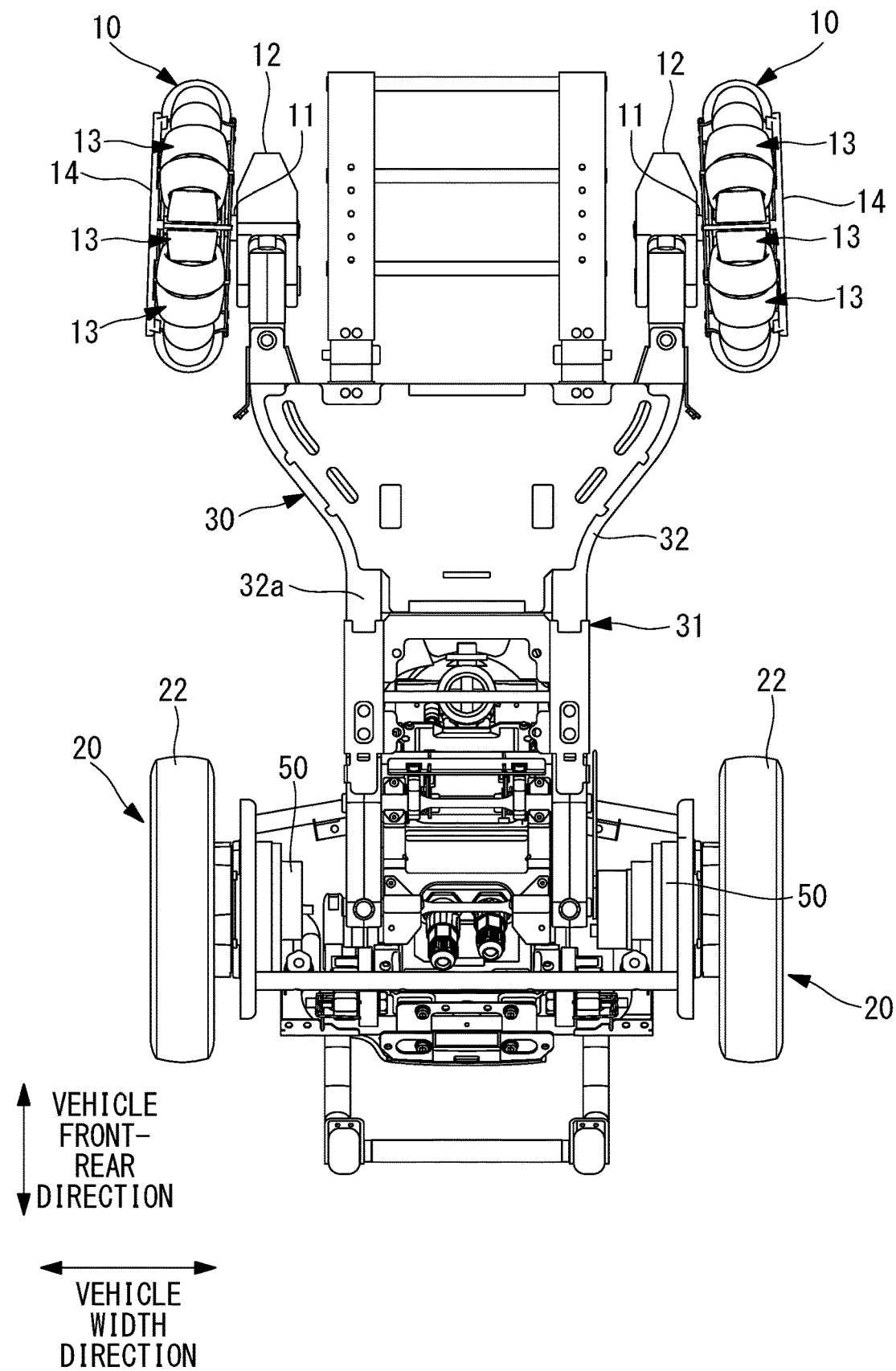
FIG. 4 is a bottom plan view of a mobility body in a state in which some parts of the above-described personal mobility vehicle in this embodiment are removed.
Figure 5:
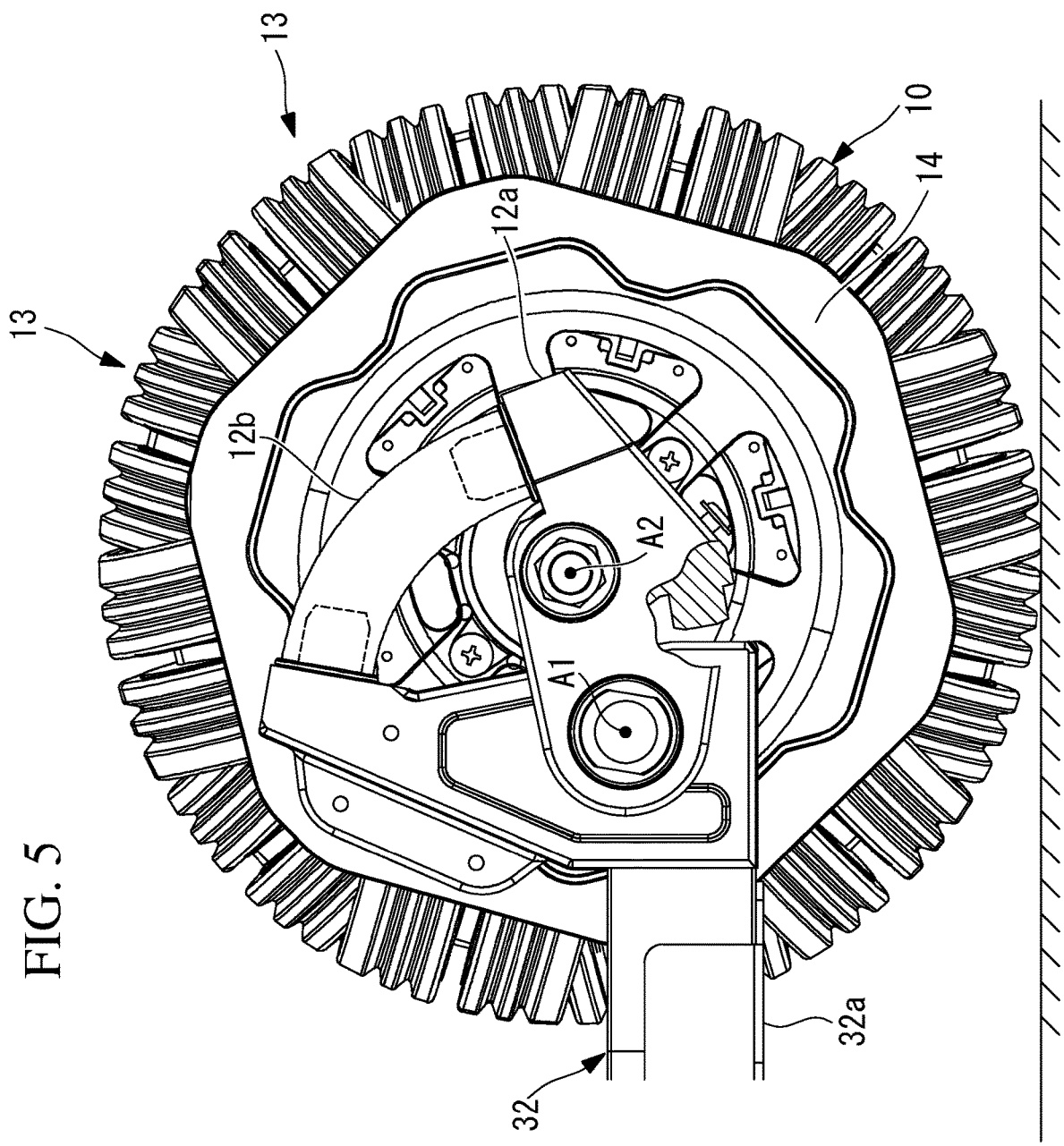
FIG. 5 is a drawing as viewed from the inner side in the width direction of a front wheel of the above-described personal mobility vehicle in this embodiment.
Figure 6:
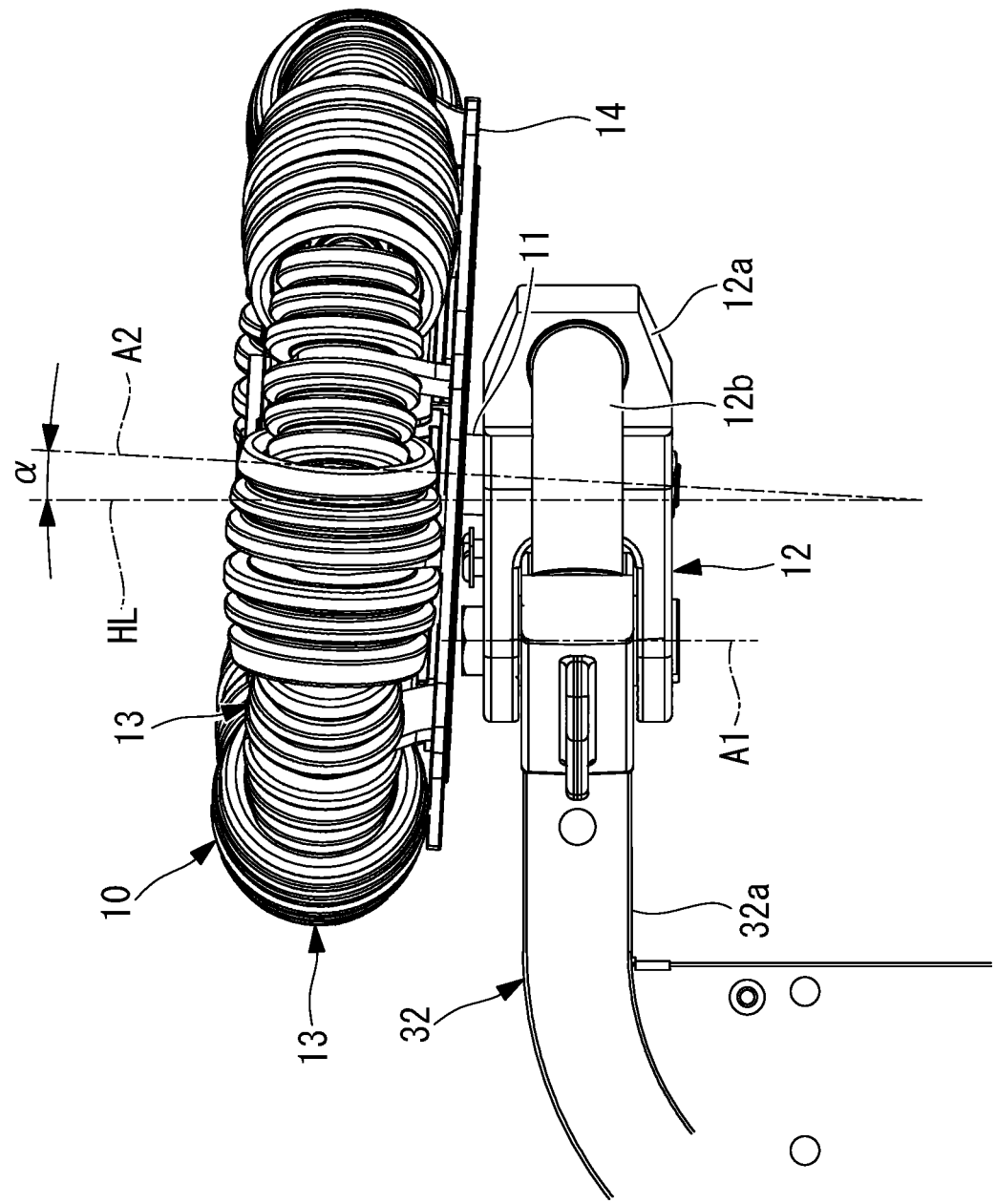
FIG. 6 is a plan view of the above-described front wheel, a suspension, and the like of the above-described personal mobility vehicle in this embodiment.

As shown in FIGS. 4 to 6, the front wheels 10 are supported by the body 31 by means of axles 11 and suspensions 12. Also, a contact surface of the front wheels 10 is formed by a plurality of rollers 13 which are arranged in a circumferential direction of the front wheels 10.

Each of the suspensions 12 has a support member 12*a* and a springy member 12*b* which is a coil spring or the like. One end side of the support member 12*a* is supported by a front end side of the body 31, and the support member 12*a* can swing around a first axis line A1 extending in the vehicle width direction. The springy member 12*b* biases the other end side of the support member 12*a* toward the vehicle front direction. The axles 11 of the front wheels 10 are fixed to the support members 12*a*. Also, as shown in FIG. 6, a second axis line A2, which is a central axis line of the axle 11, is inclined toward the front direction with respect to a horizontal line HL, which is perpendicular to the front-rear direction. In a plan view, it is preferable that an angle α which is between the second axis line A2 and the horizontal line HL is 2 degrees to 15 degrees, however, the angle α may be any other angle depending on conditions.

That is to say, the pair of front wheels 10 are in a toe-in state. In comparison with a case where the pair of front wheels 10 are arranged so as to be parallel to each other, with the pair of front wheels 10 in the toe-in state, it is possible to increase components of force toward the vehicle rear side exerted on the axles 11 when the personal mobility vehicle 1 is moving. In addition, in this embodiment, the other end of the support member 12*a* is movable toward the vehicle rear side with respect to the body 31 against the biasing force of the springy members 12*b*. Therefore, it is possible to effectively reduce vibration which is generated by collision of the rollers 13 with the contact surface. Note that, the front wheels 10 may not arranged in the toe-in state.

Each of the front wheels 10 includes a hub 14 which is attached to the axles 11, and a plurality of roller supporting shafts (not shown) which are supported by the hub 14, and the plurality of rollers 13 are supported respectively by the roller supporting shafts in a rotatable manner. Note that, the hub 14 may be attached to the axles 11 by means of a bearing or the like, and the hub 14 may be attached to the axles 11 by means of a cushioning member, an intermediate member, or the like. Axis lines of the roller supporting shafts extend in directions orthogonal to the radial direction of the axle 11.

The rollers 13 rotate around the axis line of the corresponding roller support shafts. That is to say, the front wheels 10 are omnidirectional wheels which move in every direction with respect to a travel surface.

An outer circumferential surface of the roller 13 is formed by using a material having rubber-like elasticity, and a plurality of grooves extending in the circumferential direction thereof are provided on the outer circumferential surface of the roller 13 (refer to FIGS. 5 and 6).

In this embodiment, the rear wheels 20 include an axle which is not shown, a hub 21 attached to the axle, and an outer circumferential member 22 which is provided on the outer circumferential side of the hub 21, and the outer circumferential surface thereof is formed by using a material having rubber-like elasticity, however, the omnidirectional wheels may be used as the rear wheels 20, which are the same as the front wheels 10. The axle of the rear wheels 20 may be the same with a main shaft of the motor 50.

Structure of the body 31 is changeable as required. In this embodiment, the body 31 includes a base portion 32 which extends along the ground, and a seat support portion 33 which extends toward an upper side from a rear end side of the base portion 32. The seat support portion 33 is inclined toward the vehicle front side, and a seat unit 40 is attached to the upper end side of the seat support portion 33.

The base portion 32 of this embodiment includes a metallic base frame 32*a* which supports the suspensions 12 of the front wheels 10 and the motors 50 of the rear wheels 20, and a plastic cover portion 32*b* which at least partially covers the base frame 32*a*. The cover portion 32*b* is used as a portion for putting feet of a driver seated on the seat unit 40, a portion for placing a luggage, or the like. The cover portion 32*b* also includes a pair of fenders 32*c* each of which covers the corresponding front wheels 10 from the upper side. In one example, the fenders 32*c* only have a function which covers the front wheels 10. In another example, the fenders 32*c* also have a function which strengthens rigidity of the body 31. Also, there may be a case where each of the fenders 32*c* covers only a part of the front wheels 10.

In this embodiment, the seat unit 40 has a shaft 40*a* at the lower portion thereof, and the shaft 40*a* is attached to the upper end side of the seat support portion 33. A rechargeable battery BA is provided at the back surface of the seat support portion 33, and a control unit 60, which will be described below, is placed within the seat support portion 33.

The seat unit 40 has a seat surface portion 41 on which a driver is seated, a backrest portion 42, a right control arm 43, and a left control arm 43.

An armrest 43*a* is fixed to the upper surface of each of the control arms 43. For example, the driver puts the arms on the armrests 43*a* of the pair of the control arms 43, respectively. Also, the driver puts the arms on the upper ends of the pair of control arms 43, respectively. In this embodiment, both of the control arms 43 and the armrests 43*a* are provided, however, the control arms 43 or the armrests 43*a* may only be provided. In this case, the driver puts at least one of the arms and the hands on the control arms 43, or puts at least one of the arms and the hands on the armrests 43*a*.

An operation portion 44 having an operation lever 44*a* is provided at the upper end of the right control arm 43. In such a state where no force is applied, the operation lever 44*a* is positioned at a neutral position by a springy member (not shown) which is located within the operation portion 44. The driver can displace the operation lever 44*a* toward the right direction, the left direction, the front direction, and the rear direction with respect to the neutral position.

A signal, which is in response to displacement direction and displacement amount of the operation lever 44a, is sent from the operation portion 44 to the control unit 60, which will be described below, and the control unit 60 controls the motors 50 in response to the received signal. For example, when the operation lever 44a is displaced toward the front direction with respect to the neutral position, a signal which makes the motors 50 rotate toward the vehicle front side is sent. By this, the personal mobility vehicle 1 moves forward at speed which is in response to the displacement amount of the operation lever 44a. Also, when the operation lever 44a is displaced toward the left diagonal forward direction with respect to the neutral position, a signal which makes the left motor 50 rotate toward the vehicle front side at speed which is slower than the right motor 50. By this, the personal mobility vehicle 1 moves forward while turning left at speed which is in response to the displacement amount of the lever 44a.

A setting portion 45 which is for performing all sorts of settings related to the personal mobility vehicle 1 is provided at the upper end of the left control arm 43. Examples of the various sorts of settings are settings of maximum speed, settings regarding a driving mode, and settings for locking the personal mobility vehicle 1. A plurality of operation buttons, a display, and the like are provided at the setting portion 45. Examples of the driving mode are an energy saving driving mode in which power consumption is suppressed, a sports driving mode in which running performance is enhanced and in which the electric consumption is not suppressed, a normal driving mode which is a mode between the energy saving driving mode and the sports driving mode, and the like. Examples of the settings for locking the personal mobility vehicle 1 are a setting of passcode for locking, a setting of timing for unlocking, and the like. The setting signal of the setting portion 45 is sent to the control unit 60, which will be described below, and the settings of the personal mobility vehicle 1 is set or changed in the control unit 60.

A notification device 46 is provided in each of the left and the right control arms 43. The notification device 46 is a voice generator, a display, a vibration generation device, or the like. The vibration generation device vibrates a part of the upper end side of the control arm 43, the operation portion 44, the setting portion 45, and the like, at several tens of Hz for example.

Figure 7:
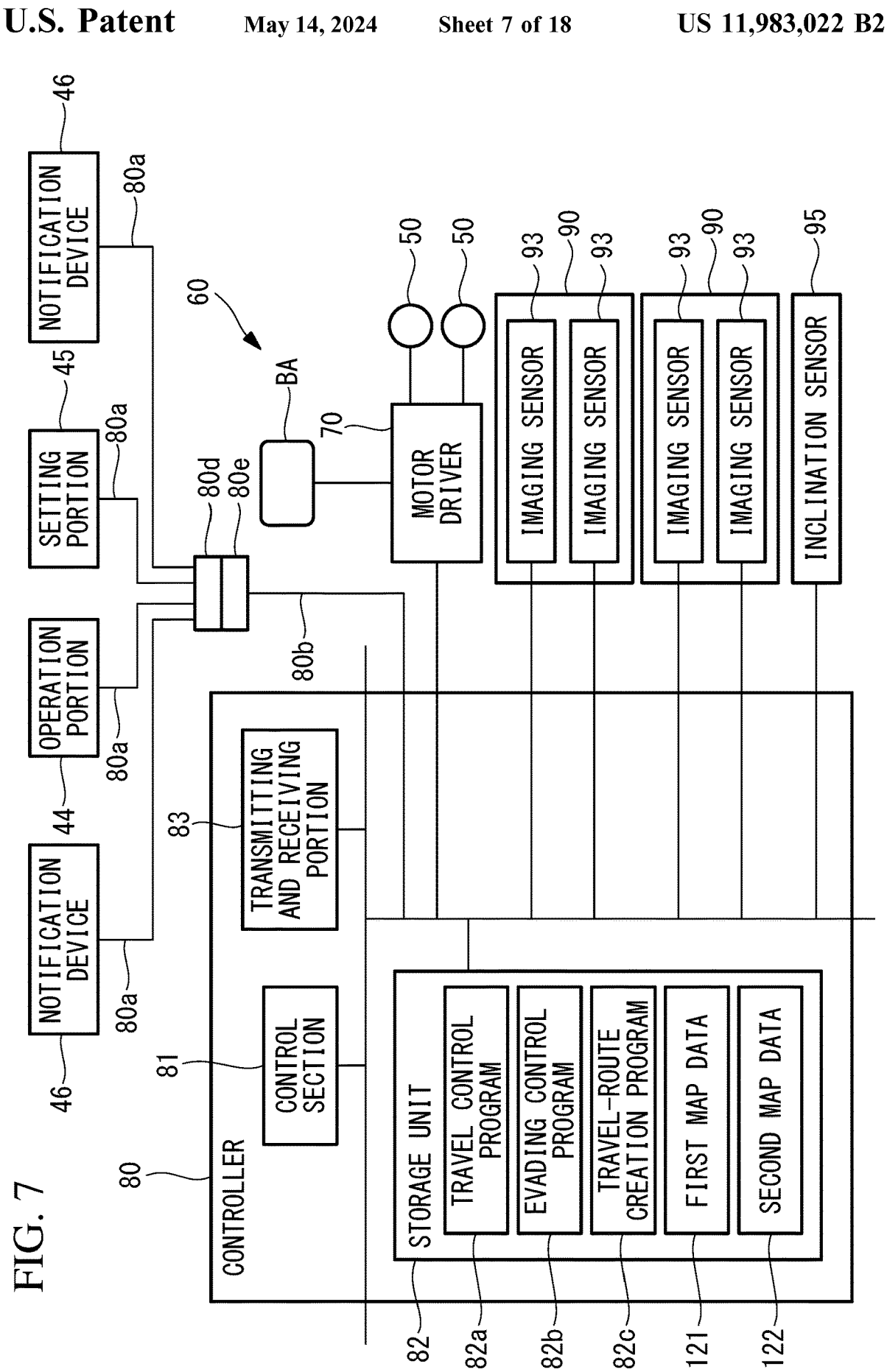
FIG. 7 is a block diagram of a control unit of the personal mobility vehicle in this embodiment.

As shown in FIG. 7, the control unit 60 has a motor driver 70 which drives the motors 50, and a controller 80.

The motor driver 70 is connected to the battery BA. Also, the motor driver 70 is connected to each of the motors 50 as well, and the motor driver 70 supplies drive power to the motors 50.

As shown in FIG. 7, the controller 80 includes a control section 81 having a CPU, a RAM, and the like, a storage unit 82 having a non-volatile storage, a ROM, and the like, and a transmitting and receiving portion 83. A travel control program 82a which controls the personal mobility vehicle 1 is stored in the storage unit 82. The control section 81 operates on the basis of the travel control program 82a, and sends drive signals for driving the motors 50 to the motor driver 70 in accordance with the signals from the operation portion 44 and the setting portion 45.

As shown in FIG. 7, the signal from the operation portion 44 and that from the setting portion 45 are sent to the controller 80 via signal lines 80a and signal lines 80b. Also, a control signal from the controller 80 is sent to the notification devices 46 via the signal lines 80a and the signal lines 80b. The signal lines 80a are provided in the seat unit 40, and the signal line 80b is provided in the body 31. Connectors 80d, 80e are provided between the signal lines 80a and the signal line 80b.

Each of two stereo cameras (sensors) 90, which is a visual sensor, is attached to the upper end side of the right control arm 43 and the upper end side of the left control arm 43. Each of the stereo cameras 90 includes a pair lens units 91 and a camera main body 92 which supports the pair of the lens units 91. A pair of imaging sensors 93 (FIG. 7) is provided inside the camera main body 92, and the pair of the imaging sensors 93 correspond to the pair of lens units 91, respectively. The imaging sensors 93 are known sensors, such as a CMOS sensor, or the like. The imaging sensors 93 are connected to the controller 80.

Figure 9:
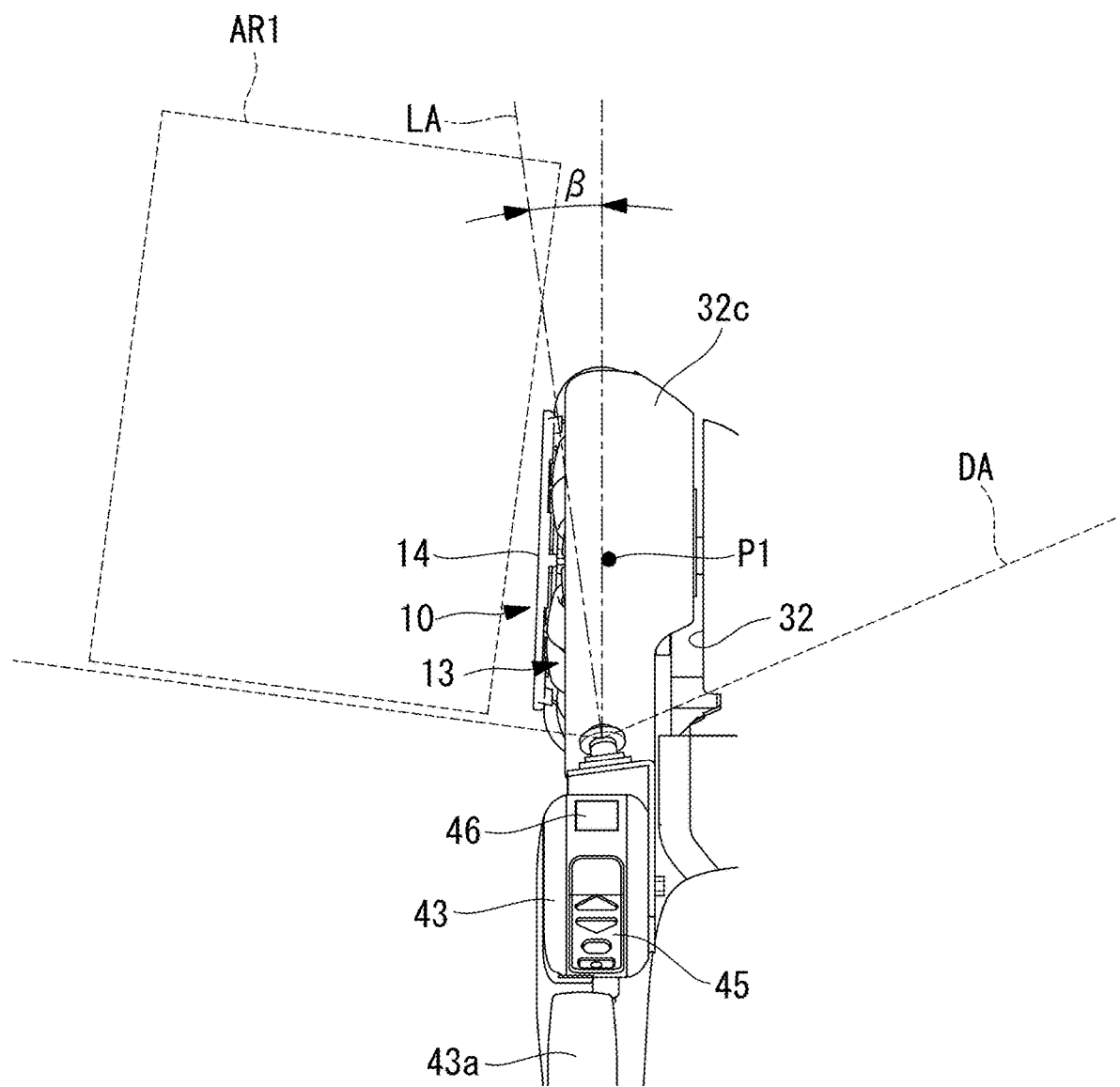
FIG. 9 is a plan view of main parts of the personal mobility vehicle in this embodiment.

As shown in FIG. 9, at least a part of the left front wheel 10, or a part of the fender 32c of the left front wheel 10 is positioned within a detection area DA of the stereo camera 90 provided at the left control arm 43. Also, an area at the outside in the width direction with respect to the left front wheel is positioned within this detection area DA.

Similarly, at least a part of the right front wheel 10, or a part of the fender 32c of the right front wheel 10 is positioned within the detection area DA of the stereo camera 90 provided at the right control arm 43. Also, an area at the outside in the width direction with respect to the right front wheel 10 is positioned within this detection area DA.

Figure 8:
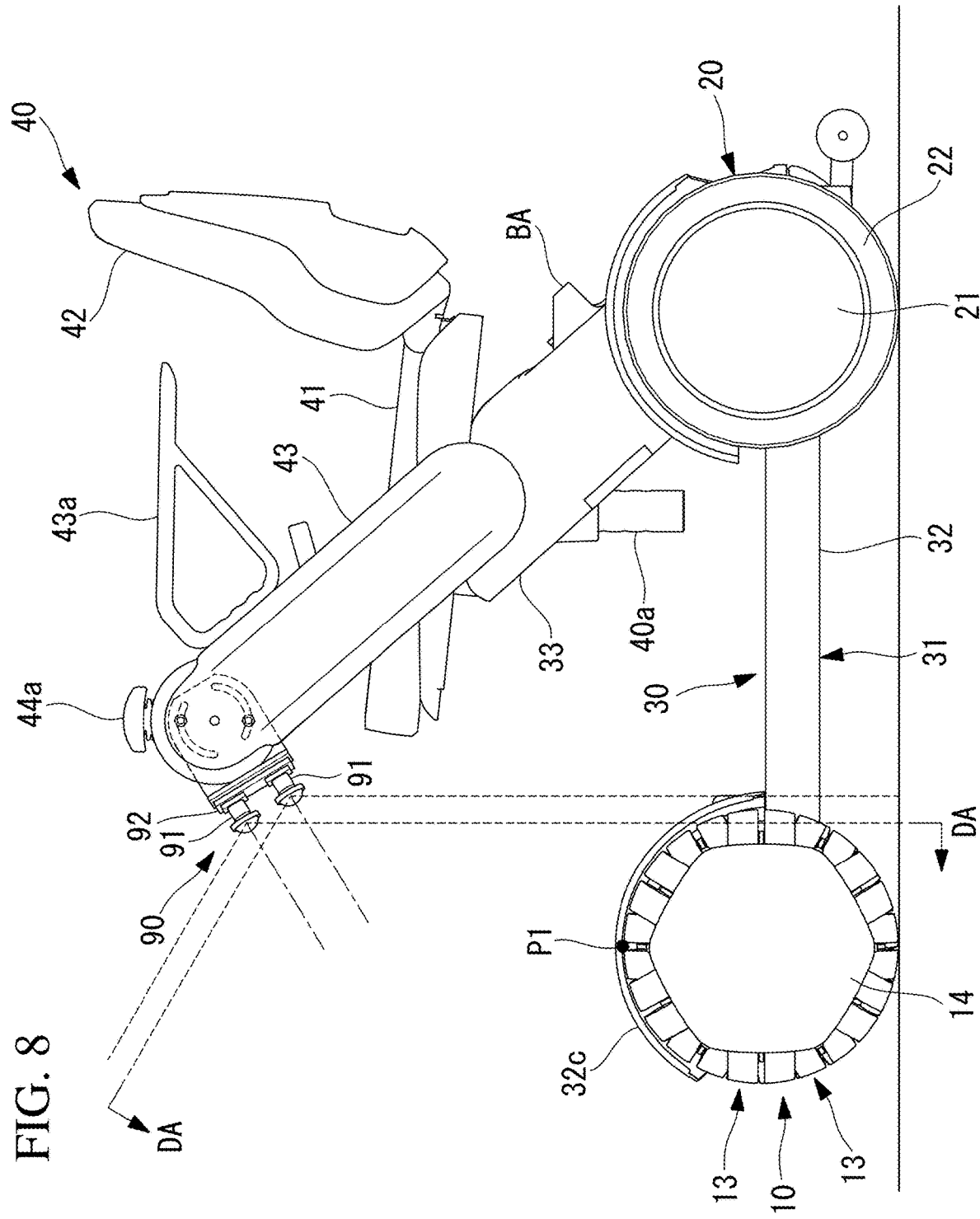
FIG. 8 is a side elevational view of the personal mobility vehicle in this embodiment.

Here, as shown in FIG. 8, for example, the detection area DA of the stereo camera 90 is an area where the image caption areas of the imaging sensors 93 are overlapped. It is intended that the detection area DA includes the outside area of the front wheel 10 in the width direction.

Also, as shown in FIG. 9, a light axis LA of each the lens units 91 of the stereo camera 90 extends diagonally toward the outside in the width direction. More specifically, in a plan view shown in FIG. 9, the light axis LA of each of the lens units 91 extends in a direction forming an angle β with respect to the front-rear direction. In one example, the angle β is 5 degrees to 30 degrees.

FIG. 9 shows a part of the detection area DA, and the detection area DA also includes an area which is located in front of the area shown in FIG. 9. As shown in FIG. 9, in this embodiment, the part of the left front wheel 10, and the part of the fender 32c of the left front wheel 10, and the travel surface at the outside in the width direction with respect to the left front wheel 10 are positioned within the detection area DA of the left stereo camera 9. In such a case where there is an object to be avoided, such as an obstacle, a wall, a gutter, or the like is on the travel surface, the object to be avoided enters the detection area DA of the stereo cameras 90. The detection area DA of the right stereo camera 90 is the same as or similar to the detection area DA of the left stereo camera 90.

Each of the stereo cameras 90 obtain two images having a parallax by means of the pair of imaging sensors 93. The two images having the parallax may be referred to as parallax images in the following description. The control section 81 of the controller 80 operates on the basis of an evading control program 82b which is stored in the storage unit 82. That is to say, the control section 81 creates distance images by processing the parallax images. And, the control section 81 detects the object to be avoided with which the front wheels 10 or the fenders 32c may come into contact. The target to be avoided is an obstacle, a person, an animal, a plant, and the like, for example. And, the obstacle is a wall, a large rock, a bump, and the like, for example. In another example, the control section 81 detects the object to be avoided, such as a bump, a hole, a gutter, or the like, which the front wheels 10 may collides against, be fallen in, or get caught in, in the distance images.

Moreover, the control section 81 controls the motors 50 by control signals for evading operation when the object to be avoided with which the wheels 10 or the fenders 32c may come into contact in a predetermined area AR1 is detected in a predetermined area AR1 in the detection area DA, for example. Also, the control section 81 controls the motors by control signals for evading operation when the control section 81 detects the object to be avoided in which the front wheels 10 may be fallen or get caught in the predetermined area AR1 in the detection area DA, for example. Examples of the evading operation include reduction of the rotation speed of the motors 50, stopping the rotation of the motors 50, controlling the motors 50 for restricting the movement of the personal mobility vehicle 1 toward the side of the object to be avoided, and the like.

In this manner, when the configuration of this embodiment is used, the travel surface at the outer side in the width direction of each of the front wheels 10 is positioned within the detection area DA of the stereo camera 90. More preferably, at least either a part of the front wheel 10 or a part of the fender 32c of the front wheel 10 should be positioned within the detection area DA of the stereo camera 90. When a bump or a slope is present at the outer side in the width direction of the front wheel 10, this configuration is advantageous in perceiving the relationship between the direction in which the mobility body 30 is oriented and the bump or the slope.

Furthermore, in order for the driver to visually check the vicinity of the front wheel 10 on the travel surface at the outer side in the width direction of the front wheel 10, the driver needs to change his/her orientation. In this embodiment, because the vicinity of the front wheel 10 on the travel surface at the outer side in the width direction of the front wheel 10 is positioned within the detection area DA of the stereo camera 90, the burden on the driver for monitoring the vicinity is reduced.

In particular, when the personal mobility vehicle 1 is run in a house or an office, the driver needs to take care not to come into contact with objects to be avoided, such as furniture, walls, and the like. In addition, the driver needs to be careful of the angle, speed, and the like at which he/she accesses an object, such as stairs, a slope, and the like. Various kinds of objects are present in a house or an office. For this reason, it is difficult for the driver to reliably perceive all of these objects by a visual check. Therefore, the configuration of this embodiment is extremely useful in a house and an office.

Note that the above-described detection area DA of each of the stereo cameras 90 is merely one example, and the stereo camera 90 may check for an object in another detection area.

Figure 10:
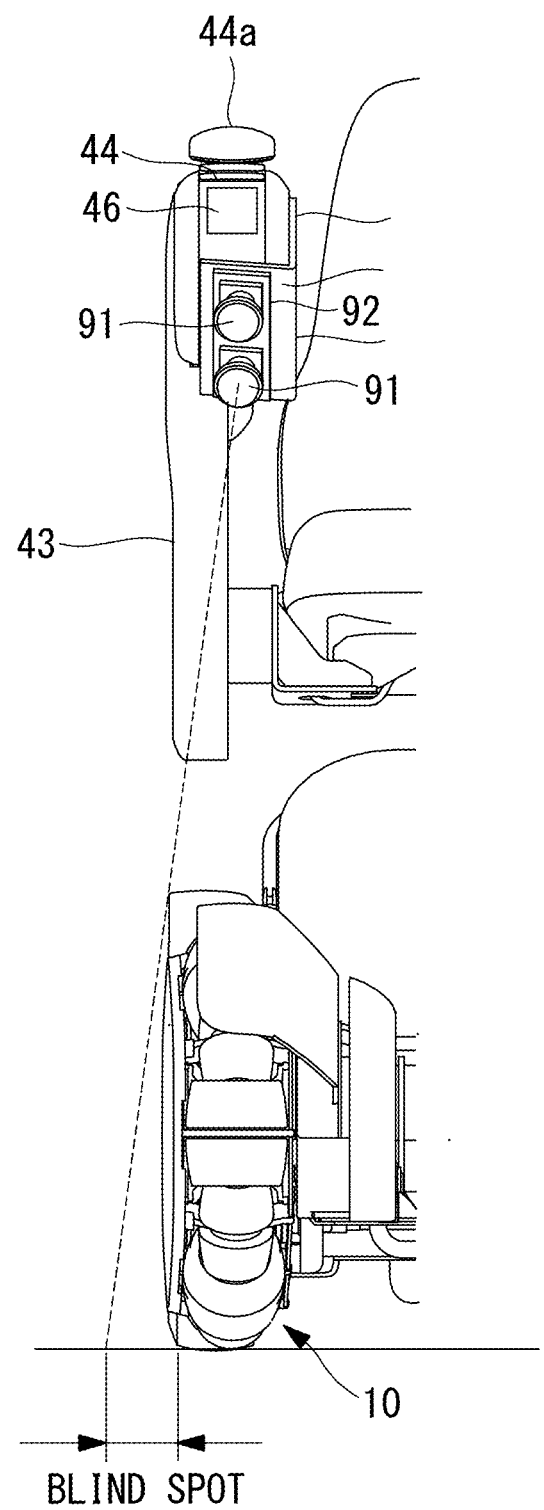
FIG. 10 is a front view of main parts of the personal mobility vehicle in this embodiment.

In addition, as shown in FIG. 8, the pair of lens units 91 of each of the stereo cameras 90 are arranged in the up-down direction. As described above, the detection area DA of the stereo camera 90 is an overlap of the image caption areas of the pair of imaging sensors 93. For this reason, the configuration of this embodiment in which the pair of lens units 91 are disposed so as to be arranged in the up-down direction is advantageous in reducing or obviating a blind spot at the outer side in the width direction of the front wheel 10, as shown in FIG. 10.

In addition, in this embodiment, each of the stereo cameras 90 is attached to the corresponding control arm 43. The control arm 43 is a portion on which the hand and the arm of the driver are placed. Each of the control arms 43 is typically disposed at the outer side in the width direction with respect to the waist of the driver seated on the seat unit 40. In addition, each of the control arms 43 is typically disposed at the outer side in the width direction with respect to the corresponding thigh of the driver seated on the seat unit 40. For this reason, the above-described configuration makes the detection area DA of each of the stereo cameras 90 less likely to be blocked by the driver's body.

Note that the seat unit 40 can be provided with a pair of arm rests 43a, instead of the pair of control arms 43. For example, each of the stereo cameras 90 can be provided on the front end portion of the corresponding arm rest 43a. This configuration also affords the same advantageous effect as the present embodiment.

Note that the stereo camera 90 can also be attached to a pole extending from the seat unit 40 or the mobility body 30, the seat unit 40, or the like.

Here, the driver can easily make visual identification of the positions of his/her hands and the positions of his/her arms. In addition, even in the case where the driver does not see the positions of his/her hands and the positions of his/her arms, the driver can intuitively recognize the rough positions of his/her hands and the rough positions of his/her arms. For this reason, the configuration of this embodiment, in which the stereo cameras 90 are provided on the control arms 43 or the arm rests 43a, is advantageous in preventing collisions of the stereo cameras 90 against a wall, or the like. In other words, the configuration of this embodiment is advantageous in preventing damage to the stereo cameras 90, positional shifting of the stereo cameras 90, and the like.

In addition, the light axis LA of each of the lens units 91 of each of the stereo cameras 90 extends obliquely towards the outer side in the width direction. For this reason, a wider area at the outer side in the width direction of the front wheel 10 is positioned within the detection area DA of the stereo camera 90. This configuration is extremely useful in reliably perceiving the relationship between the front wheel 10 and objects that are present at the outer side in the width direction of the front wheel 10.

Note that a 3D area sensor, a 3D distance sensor, or the like can be used instead of each of the stereo cameras 90. A 3D area sensor has a well-known structure in which each of the plurality of image sensors arranged on a flat surface obtains distance information. The well-known TOF method or the like can be used to obtain the distance information of each pixel. It is also possible to use a 3D distance sensor that obtains a 3D point group by receiving light from a near-infrared radiation LED or an infrared radiation LED by means of light-receiving elements, such as a plurality of CMOS sensors, disposed on a surface.

Furthermore, a laser sensor or an ultrasonic sensor can also be used instead of each of the stereo cameras 90.

Furthermore, it is also possible to use a millimeter wave sensor, which uses electromagnetic waves with a wavelength of 1-1000 mm, instead of the stereo camera 90. Alternatively, it is possible to use Light Detection and Ranging or Laser Imaging Detection and Ranging (LiDAR), in which the distance to an object is measured on the basis of reflection light of pulsed laser light being radiated.

Note that each of the stereo cameras 90 may be disposed in the interior of an upper end portion of the corresponding control arm 43. For example, the stereo camera 90 is disposed in a hollow portion provided in the control arm 43. In this case, a transparent cover is attached to the front surface of the upper end portion of the control arm 43, and the pair of lens units 91 are disposed at the inner side with respect to the cover.

Note that, as shown in FIG. 8, an area in front of the personal mobility vehicle 1 is positioned within the detection area DA of each of the stereo cameras 90 in this embodiment. For example, the area in front of the head of the driver is positioned within the detection area DA of the stereo camera 90. By doing so, it is also possible to perceive the relationship between the head of the driver and an object to be avoided that is present in front of the head of the driver.

Figure 11:
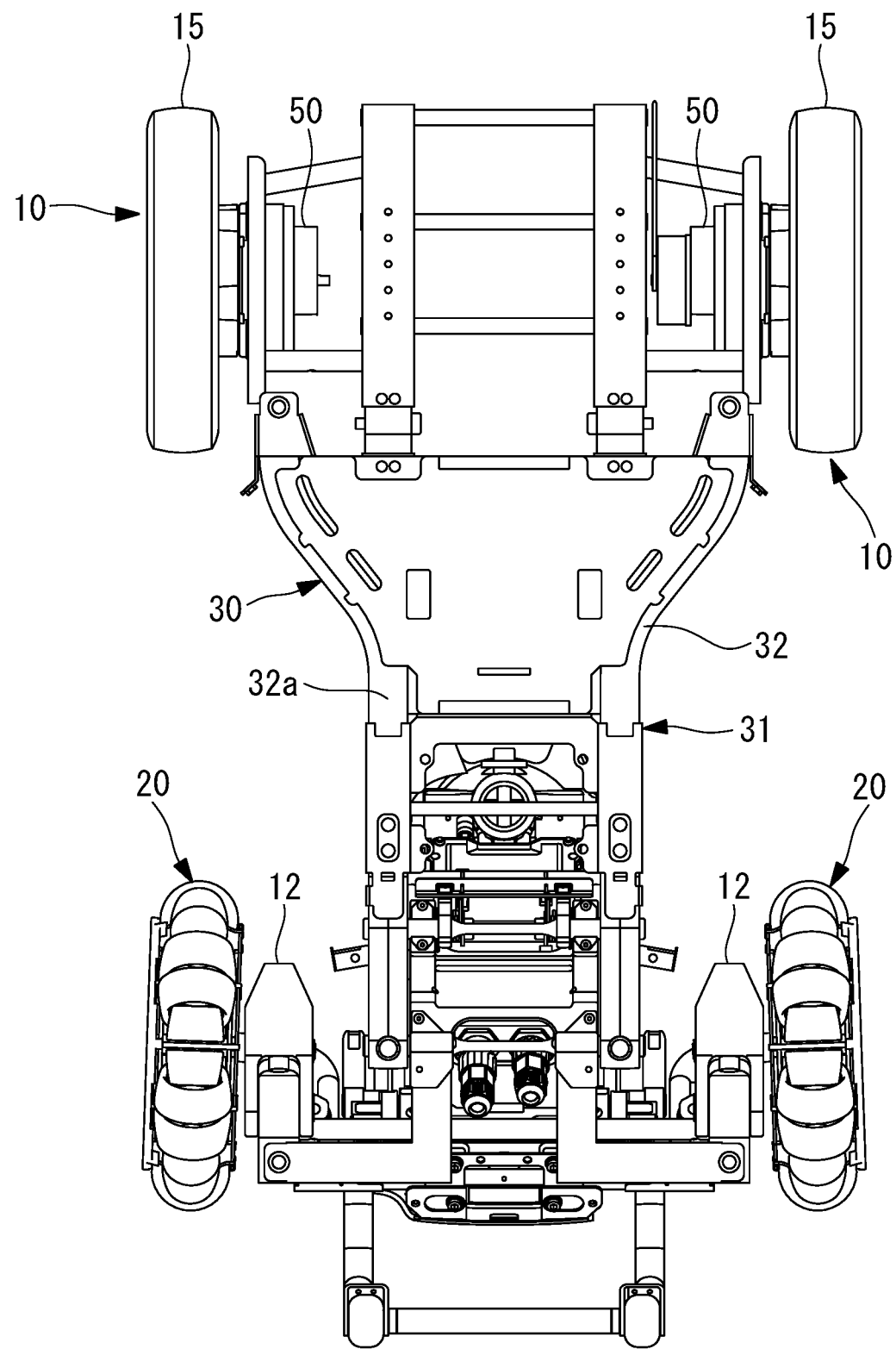
FIG. 11 is a bottom plan view of the mobility body in a state in which some parts of a modification of the personal mobility vehicle in this embodiment are removed.

In another example, as shown in FIG. 11, each of the front wheels 10 has a hub and an outer circumferential member 15 that is provided on the outer circumference of the hub and that has rubber-like elasticity. Each of the rear wheels 20 shown in FIG. 11 is an omnidirectional wheel having an axle, a plurality of rollers, and a hub similar to the above-described axle 11, rollers 13, and hub 14, respectively, and is supported on a rear end side of the body 31 with a suspension similar to the suspension 12 interposed therebetween. In addition, the motor 50 may be supported on the base frame 32*a* in the vicinity of each of the pair of front wheels 10, and each of the front wheels 10 may be driven by the corresponding motor 50. This embodiment may be configured so that the rear wheels 20 are driven by the motors 50, or alternatively, so that wheels other than the front wheels 10 and the rear wheels 20 are driven by the motors 50.

Note that, in the case where a millimeter wave sensor is used instead of each of the left and right stereo cameras 90, the antenna or substrate of the right millimeter wave sensor can be oriented obliquely downward and obliquely outward (rightward), and the antenna or substrate of the left millimeter wave sensor can be oriented obliquely downward and obliquely outward (leftward). This arrangement is useful in improving the detection accuracy of an area at the outer side in the vehicle width direction of the corresponding front wheel 10 or rear wheel 20.

Figure 12:
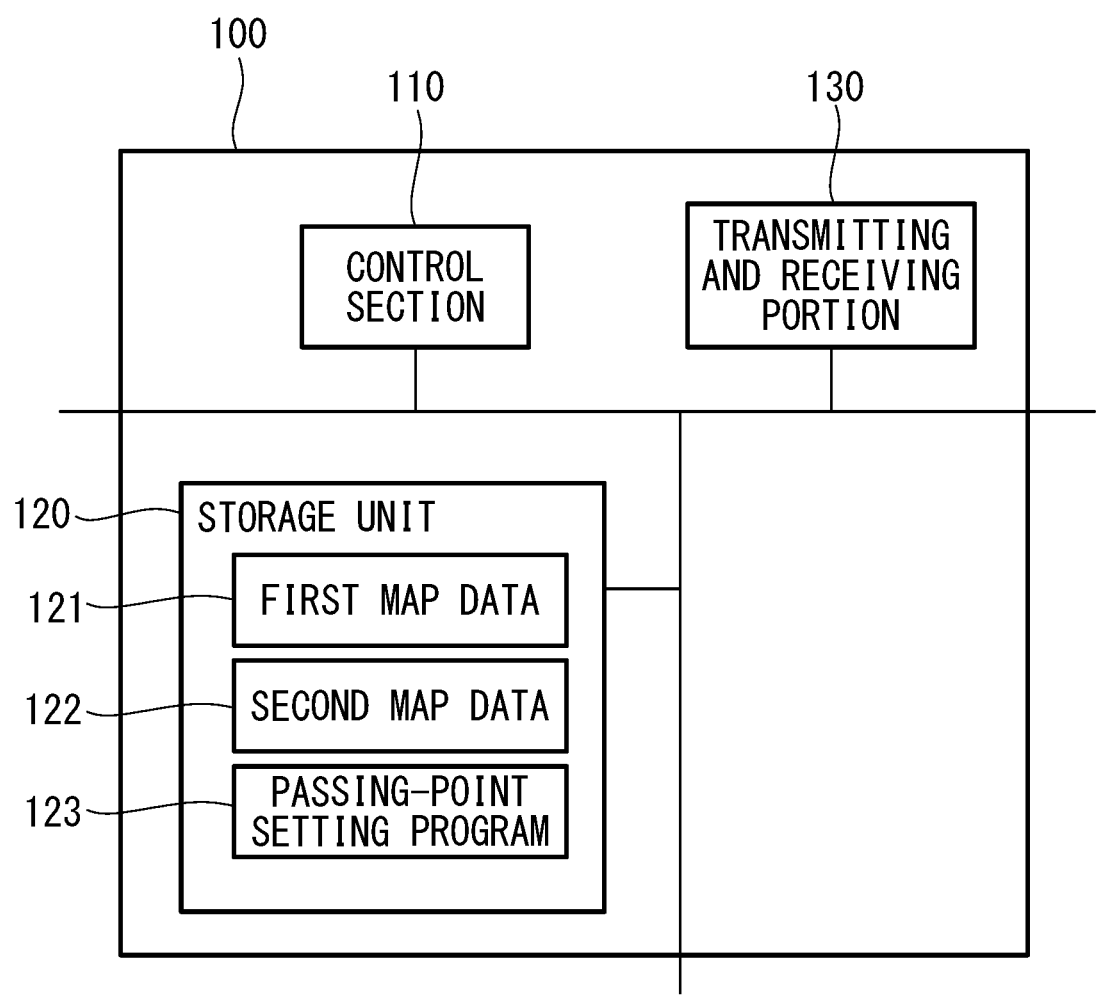
FIG. 12 is a block diagram of a server used for the travel route creation system according to this embodiment.

As shown in FIG. 12, the server 100 includes: a control section 110 having a CPU, a RAM, and the like; a storage unit 120 having a non-volatile memory, a ROM, and the like; and a transmitting and receiving portion 130. The storage unit 120 stores first map data 121 indicating areas in which the personal mobility vehicle 1 can travel and second map data 122 having information about safety while the personal mobility vehicle 1 is traveling or is at a standstill. In addition, the storage unit 120 stores a passing-point setting program 123 for setting a plurality of passing points spaced apart from one another between the current position of the personal mobility vehicle 1 and a destination.

Figure 13:
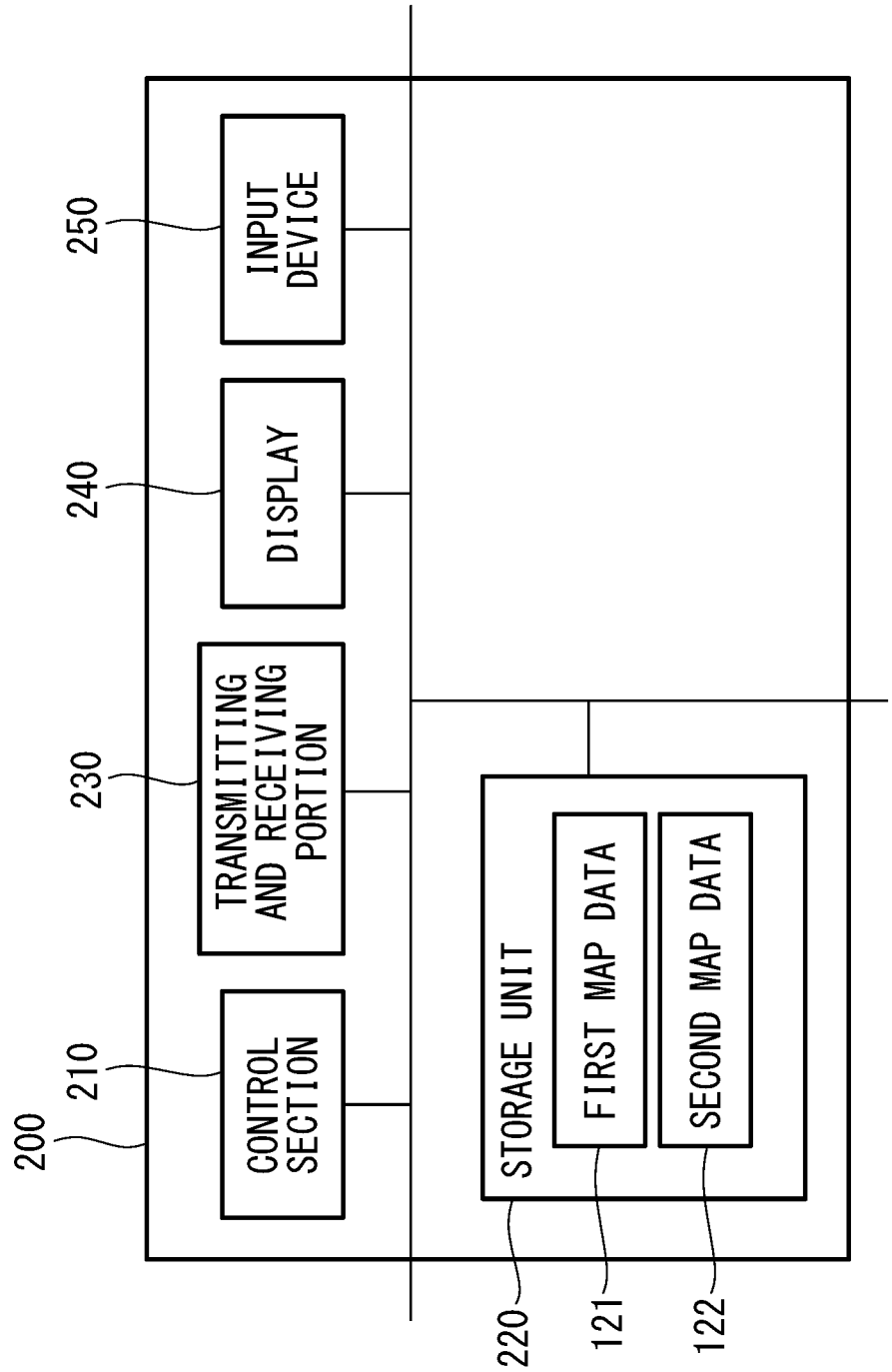
FIG. 13 is a block diagram of a terminal device used for the travel route creation system according to this embodiment.

On the other hand, a terminal device 200, such as a tablet computer or a smartphone, is provided on the personal mobility vehicle 1 side. As shown in FIG. 13, the terminal device 200 includes: a control section 210 having a CPU, a RAM, and the like; a storage unit 220 having a non-volatile memory, a ROM, and the like; a transmitting and receiving portion 230; a display 240; and an input device 250, such as a touch screen or an input key. In one example, the terminal device 200 and the controller 80 store the first map data 121 received from the server 100 or another computer. Note that the controller 80, the server 100, and the terminal device 200 can communicate with one another. The terminal device 200 is owned by, for example, the rider of the personal mobility vehicle 1, a person related to the rider, and the like. The terminal device 200 may be supported on the personal mobility vehicle 1 by using a predetermined support device.

The controller 80 stores the second map data 122 received from the server 100 or another computer. The terminal device 200 may store the second map data 122 received from the server 100 or another computer. The first map data 121 and the second map data 122 may be stored in the terminal device 200 and the controller 80 by using a medium, such as a DVD-ROM.

In one example, the first map data 121 includes map information on the interiors of buildings, the interiors of station premises, and outdoor areas. The map information on the interior of buildings and the interior of station premises includes information on objects such as pathways, rooms, doors, entrance doors, walls, columns, stairs, elevators, and escalators. The map information on outdoor areas includes information on roads, sidewalks, stairs, buildings, rivers, ponds, the sea, non-paved areas, and the like. Non-paved areas include bush areas, grassy field areas, lawn areas, gravel areas such as dirt roads, sand areas such as sandy beaches, and the like.

Figure 14:
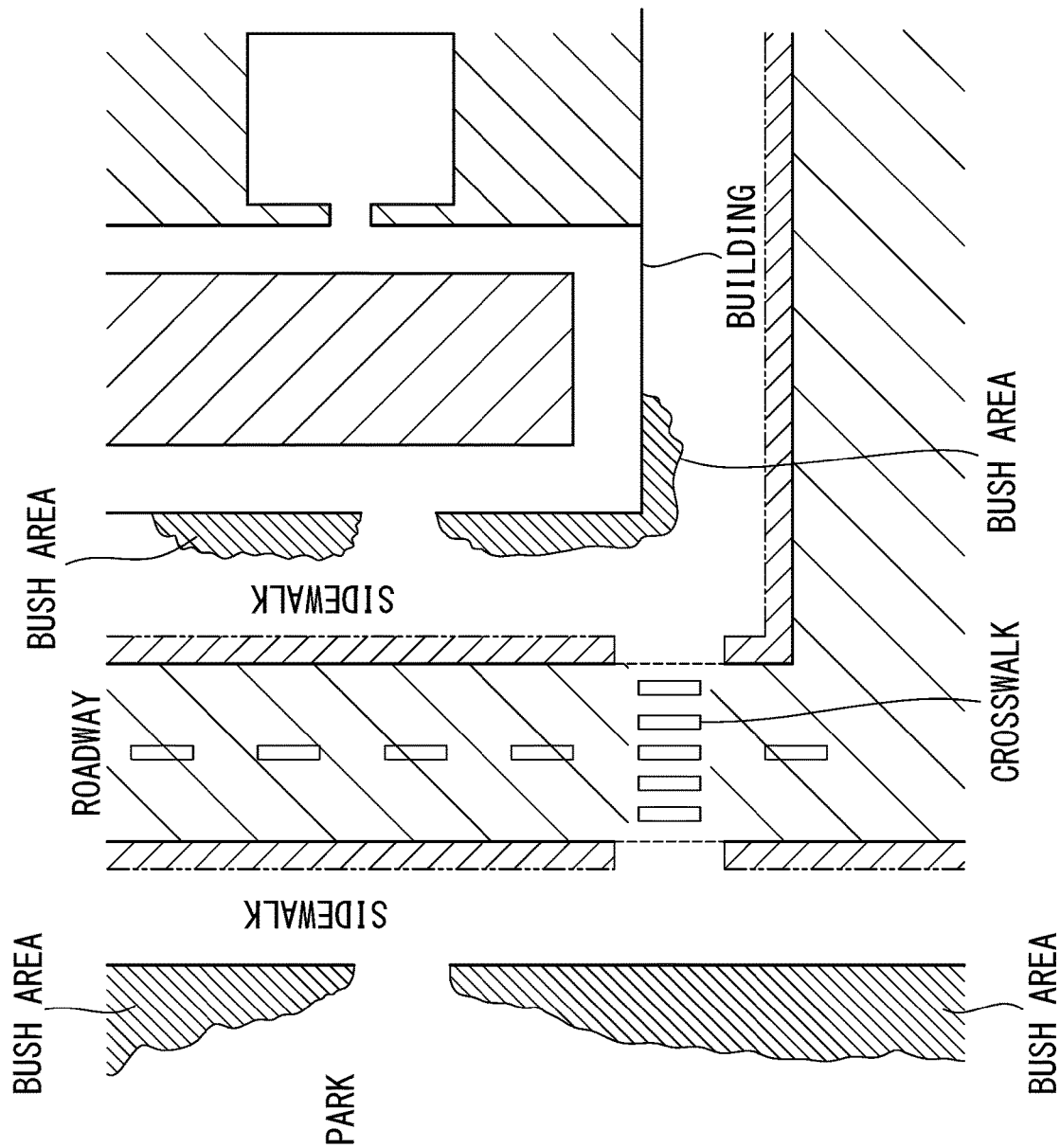
FIG. 14 is an example of first map data used for the travel route creation system according to this embodiment.

FIG. 14 shows an example of the first map data 121. In FIG. 14, the personal mobility vehicle 1 cannot travel in the hatched areas, whereas the personal mobility vehicle 1 can travel in areas other than the hatched areas. Note that grassy field areas, lawn areas, gravel areas, sandy beaches, and the like can be included in areas in which the personal mobility vehicle 1 can travel.

Figure 15:
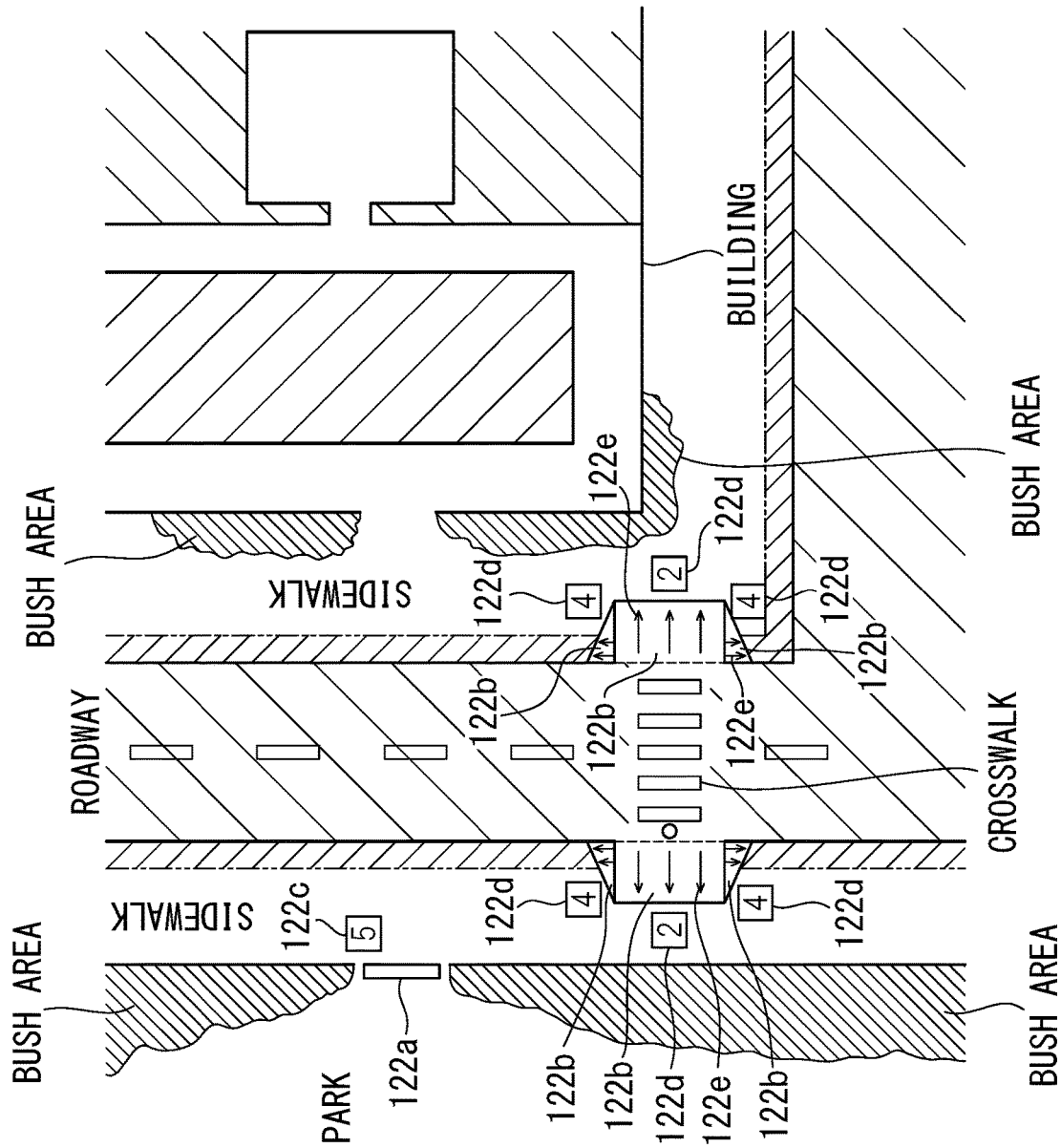
FIG. 15 is an example of first and second map data used for the travel route creation system according to this embodiment.

The second map data 122 is a map indicating a bump 122*a* and slopes 122*b* over which the personal mobility vehicle 1 can safely travel. FIG. 15 is a map formed by superimposing the second map data 122 on the first map data 121 in FIG. 14. Drawn image elements in individual map data are associated with position data thereon. The map formed as a result of superimposing the second map data 122 on the first map data 121 may be displayed on the display 240 of the terminal device 200, a display connected to the controller 80, or the like. In this case, as shown in FIG. 15, the height of the bump 122*a*, a travel difficulty level index 122*c* indicating the difficulty for traveling over the bump 122*a*, and the like may be shown in the vicinity of the bump 122*a* over which the personal mobility vehicle 1 can travel. Similarly, the gradient of a slope 122*b*, the height difference of the slope 122*b*, a travel difficulty level index 122*d* related to the difficulty for traveling over the slope 122*b*, and the like may be shown in the vicinity of the slope 122*b*. In addition, a tilt direction index 122*e* indicating the direction of a slope 122*b* may be shown on or near the slope 122*b*. In short, the second map data 122 includes the travel difficulty level indexes 122*c*, 122*d* and also includes the tilt direction index 122*e*. The travel difficulty level index 122*d* may be shown by the size, the length, the color, or the like of an arrow.

The server 100 receives, from the terminal device 200, information on the current position of the personal mobility vehicle 1 and information on a destination. The server 100 may receive, from the controller 80, information on the current position and information on a destination based on input to the setting portion 45. The information on the current position may be based on information input to the terminal device 200 by the operator of the terminal device 200. For example, the operator inputs, to the terminal device 200, information that can identify the position at which the personal mobility vehicle 1 is disposed, such as a building name, a room number, and a floor number. The operator may input an arbitrary position on the first map data 121 displayed on the display 240 by using a pointer, a touch screen function, or the like. The information based on the identified position is transmitted from the terminal device 200 to the server 100. In the case where the control section 81 of the controller 80 performs well-known current position estimation by using a Global Navigation Satellite System (GLASS) receiver, an odometer, the stereo cameras 90, or the like provided on the personal mobility vehicle 1, the estimated position may be transmitted from the controller 80 to the server 100 as the information on the current position. In contrast, in the case where the information on the current position is based on input performed by the operator, the information on the current position can be set easily, whereby setting of the current position becomes reliable in many cases. In addition, because the capacity of the battery BA of the personal mobility vehicle 1 is strictly limited, it is more preferable in reducing the power consumption of the battery BA to set the information on the current position on the basis of input performed by the operator.

Figure 16:
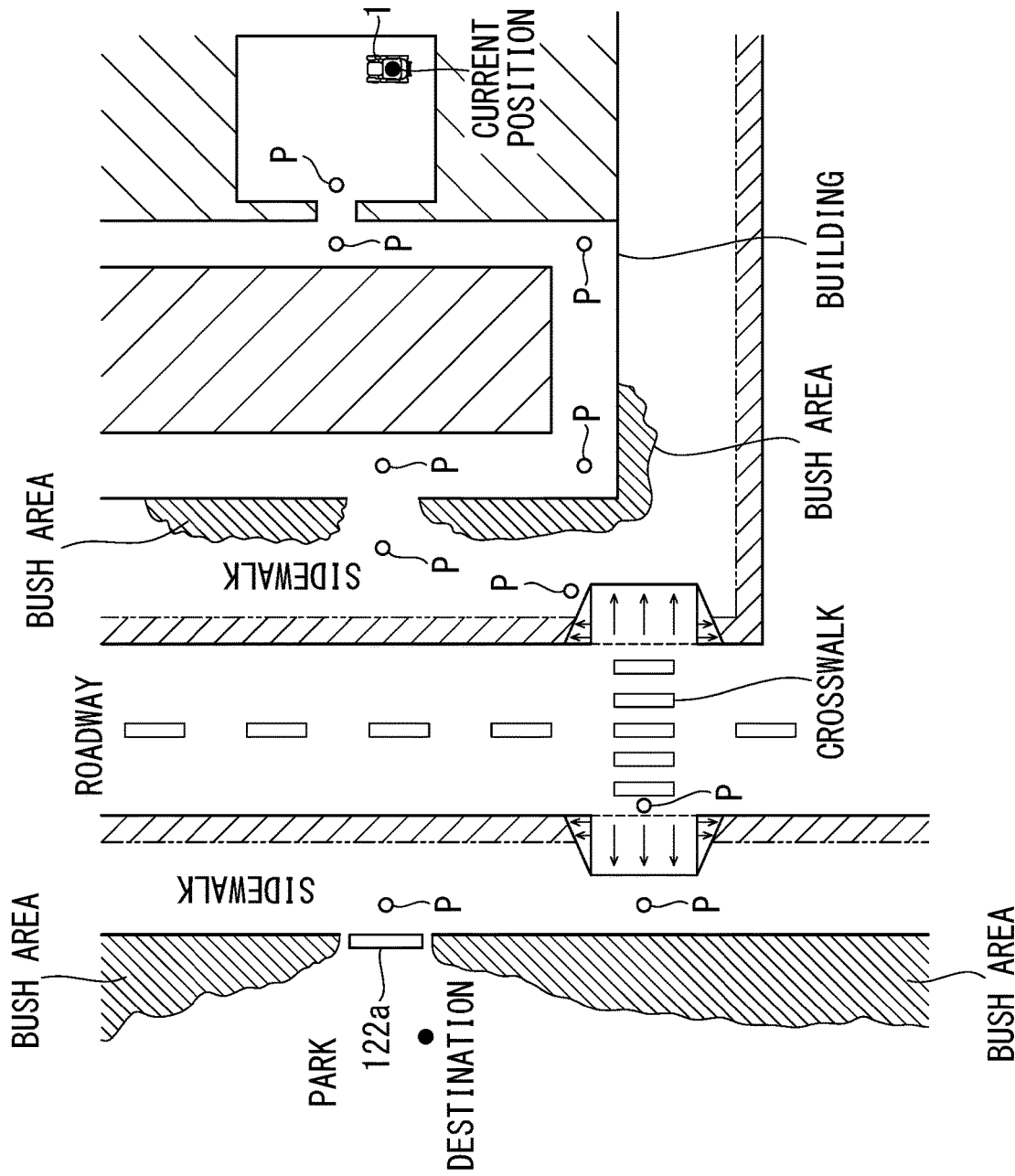
FIG. 16 is a diagram depicting examples of passing points that are set in the travel route creation system according to this embodiment.

In the example shown in FIG. 16, the current position is a location in a room of a building, and the destination is a location in a park. The control section 110 of the server 100 sets a plurality of passing points P between the current position and the destination on the basis of the passing-point setting program 123 and transmits, to the controller 80, information on the passing points P that have been set. The information on the passing points P that have been set may be transmitted to the terminal device 200. For example, in the controller 80, the series of passing points P shown in FIG. 16 are set on a map including the first map data 121 and the second map data. Information on the passing points P is, for example, the position information about each of the passing points P on the first map data 121.

Subsequently, in the case where the personal mobility vehicle 1 is in an autonomous driving mode, the control section 81 of the controller 80 creates travel routes between the plurality of passing points P so as to pass, one after another, the plurality of passing points P or the vicinity thereof, on the basis of a travel-route creation program 82c stored in the storage unit 82. More specifically, the control section 81 creates a travel route up to the next passing point (the next passing point which the personal mobility vehicle 1 should pass) P by using data obtained by sensors such as the stereo cameras 90, the first map data 121, and the second map data 122. Also, when arriving at the next passing point P or the vicinity thereof, the control section 81 further creates a travel route up to the next passing point P by using the data obtained by sensors such as the stereo cameras 90, the first map data 121, and the second map data 122. Note that the personal mobility vehicle 1 enters the autonomous driving mode on the basis of, for example, an input to the input device 250 of the terminal device 200 or an input to the setting portion 45. Note that each of the passing points P may include information on the direction in which the personal mobility vehicle 1 should be oriented (arrangement information). In this case, a created travel route is used to make the direction of the personal mobility vehicle 1 coincide with the arrangement information included in the next passing point P when the personal mobility vehicle 1 reaches the next passing point P.

In the autonomous driving mode, the control section 81 of the controller 80 transmits drive signals for driving each of the motors 50 to the motor driver 70, thereby causing the personal mobility vehicle 1 to follow the created travel route. At this time, the travel route may be displayed on the display 240 of the terminal device 200, and also the position of the personal mobility vehicle 1 obtained moment by moment by using well-known current position estimation technology may be displayed on the display 240.

Here, the word "vicinity" means that, for example, the distance from the personal mobility vehicle 1 to a passing point P is less than or equal to a reference distance (several meters in one example). In addition, the passing points P may be set every several meters or may be set every 10-20 meters. These examples are not meant to limit the passing points P from being set at intervals of larger distances.

Figure 17:
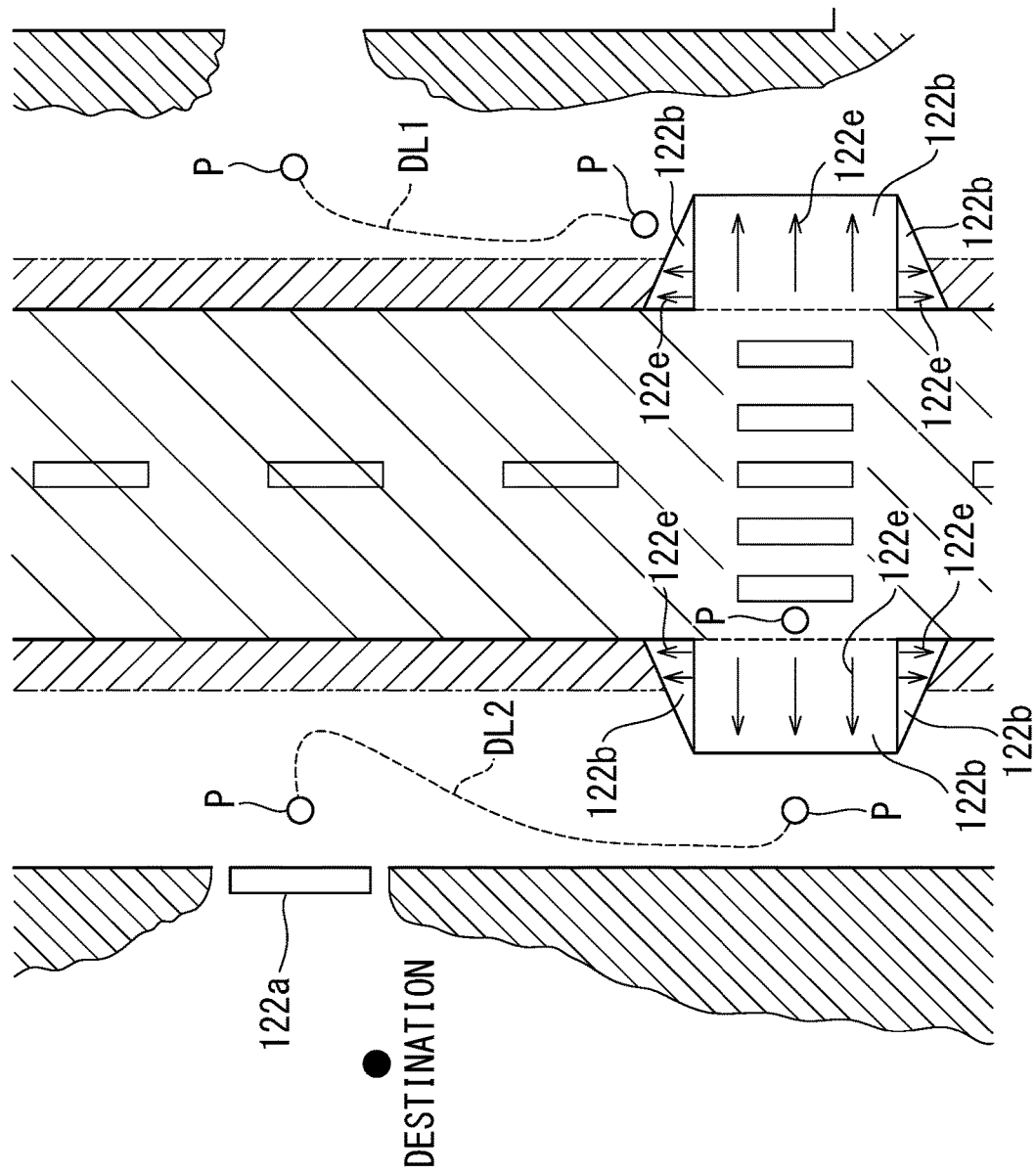
FIG. 17 is a diagram depicting examples of passing points and a travel route that are set in the travel route creation system according to this embodiment.

When creating a travel route passing via a bump 122a, the control section 81 sets the angle at which the personal mobility vehicle 1 enters the bump 122a within an angle range from 45° to 90°, in which 45° and 90° are included, in this travel route. In one example, a travel route is created between two passing points P, as shown in FIG. 17 by a broken line DL1. In addition, another travel route is created between two passing points P, as shown in FIG. 17 by a broken line DL2. In the travel route DL1, the angle at which the personal mobility vehicle 1 enters the slope 122b is within the angle range from 45° to 90° in which 45° and 90° are included. In the travel route DL2, the angle at which the personal mobility vehicle 1 enters the bump 122a is within the angle range from 45° to 90° in which 45° and 90° are included.

Note that, in the personal mobility vehicle 1 in this embodiment 1, the front wheels 10 or the rear wheels 20 are omnidirectional wheels. For this reason, the personal mobility vehicle 1 can change the direction thereof at that point without having to move forward or backward. For this reason, positions just before the bump 122a and the slope 122b in a travel route created by the control section 81 may include accompanying information about the direction in which the personal mobility vehicle 1 should be oriented at those positions. This accompanying information constitutes a part of the created travel route, and the personal mobility vehicle 1 changes its direction according to this accompanying information. Note that the controller 80 of the personal mobility vehicle 1 controls each of the motors 50 via the motor driver 70 by using detection results of sensors such as the stereo cameras 90 so that the access angle is within the above-described angle range. Preferably, when the personal mobility vehicle 1 is to actually access the bump 122a and the slope 122b and also while the personal mobility vehicle 1 is traveling over the bump 122a and the slope 122b, the controller 80 should control each of the motors 50 by using the detection results of sensors such as the stereo cameras 90 so that the access angle is within the above-described angle range.

Figure 18:
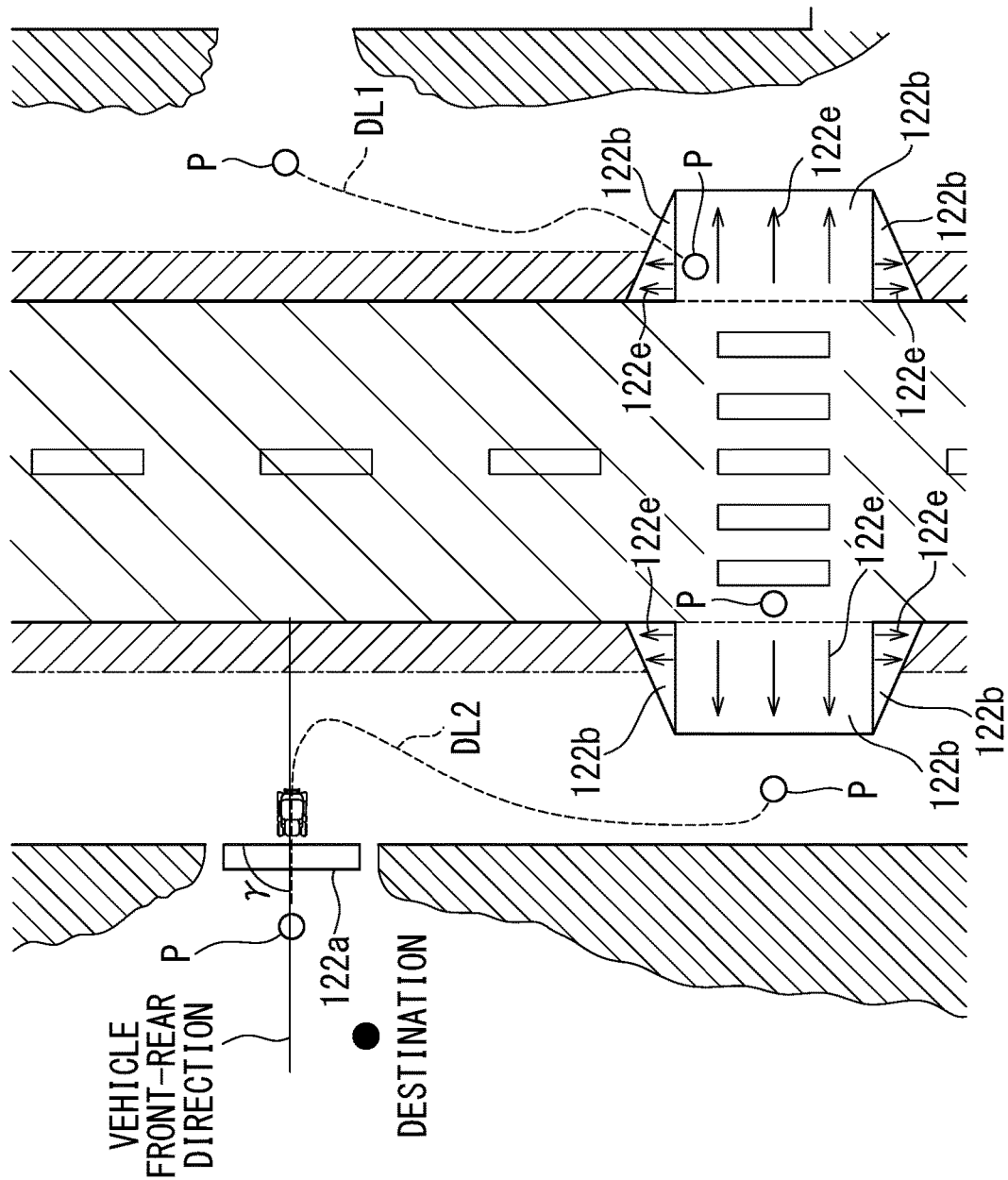
FIG. 18 is a diagram depicting examples of passing points and a travel route that are set in the travel route creation system according to this embodiment.

Although passing points P are set just before the bump 122a and the slope 122b in the example shown in FIG. 17, passing points P may be set beyond the bump 122a and the slope 122b, as shown in FIG. 18. Also in this case, the control section 210 sets the angle at which the personal mobility vehicle 1 enters the bump 122a and the slope 122b within the angle range from 45° to 90° in which 45° and 90° are included.

Note that the angle at which the personal mobility vehicle 1 enters the bump 122a or the slope 122b may be preferably set within the angle range from 45° to 85° in which 45° and 85° are included in some cases in order to mitigate the impact produced when the personal mobility vehicle 1 enters the bump 122a or the slope 122b.

Here, as shown in FIG. 18, the access angle is an acute angle α between the vehicle front-rear direction of the personal mobility vehicle 1 and the extension direction of the bump 122a or the angle between the vehicle front-rear direction of the personal mobility vehicle 1 and the extension direction of the edge line of the slope 122b.

In addition, the control section 81 creates, as a part of a travel route, information on the orientation of the personal mobility vehicle 1 (direction in which the personal mobility vehicle 1 is oriented) at the time the personal mobility vehicle 1 stops in each of the slopes 122*b*. For example, the control section 81 creates orientation information of the personal mobility vehicle 1 so that the angle formed between the orientation of the arrow of the tilt direction index 122*e* and the vehicle front-rear direction of the personal mobility vehicle 1 is set within an angle range of 45° or less in which 45° is included. When the personal mobility vehicle 1 stops in a slope 122*b*, the control section 81 of the controller 80 transmits, to the motor driver 70, drive signals for driving each of the motors 50, thereby causing the orientation of the personal mobility vehicle 1 to be an orientation in accordance with the orientation information included in the travel route.

If the above-described angle is large in the case where the front wheels 10 or the rear wheels 20 of the personal mobility vehicle 1 are omnidirectional wheels or casters, the front end side or the rear end side of the personal mobility vehicle 1 could unintentionally move in the vehicle width direction when the personal mobility vehicle 1 stops. For this reason, the above-described angle should preferably be an angle that can prevent such an unintentional movement. For example, the front wheels 10 or the rear wheels 20 of the personal mobility vehicle 1 in this embodiment are omnidirectional wheels. For this reason, when the central axis line of the axle 11 of each of the omnidirectional wheels coincides with the tilt direction of a slope 122*b*, the omnidirectional wheels unintentionally move downward on the slope 122*b*. The above-described configuration capable of preventing such a movement is advantageous in improving the safety of the rider of the personal mobility vehicle 1 and people around the vehicle.

Note that any of the controller 80, the server 100, and the terminal device 200 may receive travel area reference information on the basis of input performed by the operator or the rider and may change, in the first map data 121, areas in which the personal mobility vehicle 1 can travel according to the received travel area reference information. For example, the operator or the rider inputs a setting value of the travel area reference information to the setting portion 45 or the input device 250 of the terminal device 200. When a setting value placing importance on safety is input, a new untravelable area is added to the first map data 121. For example, the width of an untravelable area in the vicinity of the roadway is increased. Data on the newly added untravelable area may be included in the second map data 122. This realizes autonomous running which further matches a demand from the rider.

In addition, in the second map data 122, a travel fatigue index may be associated with each partial area in a travelable area. In one example, the travel fatigue index relates to an irregularity state of the travel surface, a level of slipperiness of the travel surface, and the like. In addition, any of the controller 80, the server 100, and the terminal device 200 receives a request related to travel fatigue on the basis of input performed by the operator or the rider. In this case, the control section 110 of the server 100 sets a plurality of passing points according to the above-described request with reference to the travel fatigue index of each of the partial areas. The control section 81 of the controller 80 may create a travel route according to the above-described request, referring to the travel fatigue index of each of the partial areas. This realizes autonomous running according to the state of the rider.

On the other hand, on the basis of input performed by the operator or the rider, at least any one of the controller 80, the server 100, and the terminal device 200 may receive a request related to travel fatigue for achieving sooner arrival at the destination. In this case, the control section 110 sets passing points by taking into account placing importance on a reduction in the travel time, and accordingly, the control section 81 also creates travel routes by taking into account placing importance on a reduction in the travel time.

In addition, in the case of, for example, foul weather, rainy weather, snowfall, or hot weather, if at least any one of the controller 80, the server 100, and the terminal device 200 receives a request for avoiding these severe meteorological conditions on the basis of input performed by the operator, the rider, or the like, the control section 110 sets passing points for avoiding these severe meteorological conditions, and accordingly, the control section 81 creates travel routes for avoiding these severe meteorological conditions.

Any of the controller 80, the server 100, and the terminal device 200 may receive, on the basis of input performed by the operator or the rider, evaluation scores of bumps, slopes, and the like in the first map data 121 or the second map data 122. For example, the terminal device 200 displays a selected bump 122*a* or slope 122*b* together with choices of evaluation scores on the display 240. The bump 122*a* or the slope 122*b* disposed closest to the personal mobility vehicle 1 may be displayed as the selected bump 122*a* or slope 122*b* on the display 240, or alternatively, a bump 122*a* or a slope 122*b* may be selected on the basis of input performed by the operator or the rider. When an evaluation score is selected on the basis of input performed by the operator or the rider, the selected evaluation score is transmitted to the server 100 together with information on the corresponding bump 122*a* or slope 122*b*. The control section 110 of the server 100 accumulates the received evaluation score in the storage unit 120, determines the travel difficulty level indexes 122*c* and 122*d* of the bumps 122*a* and the slopes 122*b* on the basis of the accumulated evaluation score, and reflects the determined travel difficulty level indexes 122*c* and 122*d* on the second map data 122.

The personal mobility vehicle 1 may be provided with a well-known inclination sensor 95 (FIG. 7). In this case, the controller 80 receives a measurement value of the inclination sensor 95. In addition, the controller 80 transmits, to the server 100, the received measurement value which is associated with the current position that has been estimated by using the GNSS receiver, odometer, stereo cameras 90, or the like. The control section 110 of the server 100 accumulates the received measurement value in the storage unit 120 as an evaluation score, determines a travel difficulty level index 122*d* of each of the slopes 122*b* on the basis of the accumulated evaluation score, and reflects the determined travel difficulty level index 122*d* on the second map data 122.

On the basis of input performed by the operator or the rider, any of the controller 80, the server 100, and the terminal device 200 may receive an evaluation score of a people congestion level in each of the travelable areas (how heavily the area is crowded) on the first map data 121. For example, the terminal device 200 displays, on the display 240 thereof, a selected partial area in a travelable area together with choices of evaluation scores. The partial area disposed closest to the personal mobility vehicle 1 may be selected, or alternatively, a partial area may be selected on the basis of input performed by the operator or the rider. When an evaluation score is selected on the basis of input performed by the operator or the rider, the selected evaluation score is transmitted to the server 100 together with information on the corresponding partial area. The control section 110 of the server 100 accumulates the received evaluation score in the storage unit 120, determines a travel difficulty level index of each of the partial areas on the basis of the accumulated evaluation score, and reflects the determined travel difficulty level index on the second map data 122.

Any of the controller 80, the server 100, and the terminal device 200 may receive evaluation scores of travel difficulty level in buildings, facilities, and shops on the first map data 121 on the basis of input performed by the operator or the rider. For example, the terminal device 200 displays, on the display 240 thereof, a selected building, facility, or shop together with choices of evaluation scores. The building, facility, or shop disposed closest to the personal mobility vehicle 1 may be selected, or alternatively, a building, a facility, or a shop may be selected on the basis of input performed by the operator or the rider. When an evaluation score is selected on the basis of input performed by the operator or the rider, the selected evaluation score is transmitted to the server 100 together with information on the corresponding building, facility, or shop. The control section 110 of the server 100 accumulates the received evaluation score in the storage unit 120, determines a travel difficulty level index of each of the buildings, facilities, and shops on the basis of the accumulated evaluation score, and reflects the determined travel difficulty level index on the second map data 122.

These configurations are advantageous in efficiently creating second map data 122 which matches a request from the rider of the personal mobility vehicle 1. In particular, updating the second map data 122 on the basis of evaluation scores input by the rider is based on the perspectives of the rider who actually uses the second map data 122, which allows the second map data 122 to be reliable to the rider.

Note that the terminal device 200 may display choices of attributes of the rider on the display 240 thereof. The attributes include the age of the rider, the condition of the rider, and the like. In this case, the server 100 can accumulate, in the storage unit 120, the received evaluation scores, classified by attribute, and can create a plurality of items of second map data 122 corresponding to the plurality of respective attributes. In short, for example, the plurality of items of second map data 122 have different travel difficulty level indices 122*c* and 122*d*. As a result of the rider selecting an item of second map data 122 according to his/her state and the like, passing points are set and travel routes are created according to the state of the rider.

Note that the terminal device 200 may be responsible for some or all of the above-described functions of the controller 80. For example, the control section 210 of the terminal device 200 may set a travel route between passing points P. In this manner, a control section of another computer device can execute some or all of the above-described functions of the controller 80.

In this embodiment, the control section 81 creates travel routes for the personal mobility vehicle 1 on the basis of the first map data 121 indicating areas in which the personal mobility vehicle 1 can travel and the second map data 122 having information about safety while the personal mobility vehicle 1 is traveling or is at a standstill.

For example, the first map data 121 includes data on the positions and areas of sidewalks, the interiors of buildings, the interiors of station premises, open spaces, parks, and the like, and the second map data 122 includes information about bumps, slopes, and the like that are present on sidewalks, in buildings, in station premises, in open spaces, in parks, and the like. In the present aspect, because the second map data 122 having information about safety while the personal mobility vehicle 1 is traveling or is at a standstill is used, travel routes are set by taking into account safety while the personal mobility vehicle 1 is traveling or is at a standstill.

In addition, it is possible to create first map data 121 having almost all of the positions and areas of sidewalks, interiors of buildings, interiors of station premises, open spaces, parks, and the like. In addition, the positions and areas of sidewalks, interiors of buildings, interiors of station premises, open spaces, parks, and the like are not changed so often, and therefore, once the first map data 121 is created, the update frequency thereof is not so high. On the other hand, it is difficult to create second map data 122 including almost all information about safety while the personal mobility vehicle 1 is traveling or is at a standstill. For example, it is difficult for the rider of the personal mobility vehicle 1 to perceive, with his/her eyes in a short time period, all bumps, slopes, and the like that are present on sidewalks, in buildings, in station premises, in open spaces, in parks, and the like. In addition, the first map data 121 has detailed shape information, position information, and the like of each element, and thus it often takes a long time to add data to the first map data 121. In contrast, in the aforementioned aspect, it is possible to update the second map data 122, which has, for example, a simple data structure different from that of the first map data 121. Therefore, it is possible to update the second map data 122 moment by moment, which makes it possible to set travel routes in accordance with a request from the rider of the personal mobility vehicle 1.

In addition, the travel route creation system according to this embodiment includes: the server 100 for setting a plurality of passing points P spaced apart from one another between the current position of the personal mobility vehicle 1 and a destination at least on the basis of the first map data 121 indicating areas in which the personal mobility vehicle 1 can travel, information on the current position of the personal mobility vehicle 1, and information on the destination; the sensors provided in the personal mobility vehicle 1; and the control sections 81 and 210 that receive information on the plurality of passing points P from the server 100 and that create travel routes between the plurality of passing points P by using data obtained with the sensors so as to pass, one after another, the passing points P or the vicinities thereof.

The control sections 81 and 210 create travel routes between the plurality of passing points P. In short, if a travel route up to the next passing point P has been created, the personal mobility vehicle 1 can arrive at that passing point P or the vicinity thereof. More specifically, even in the case where it becomes necessary to change a travel route for the personal mobility vehicle 1 according to the presence, motion, and the like of other objects including people and bicycles, the control sections 81 and 210 just need to change the travel route up to the next passing point P. Therefore, power consumption due to moment-by-moment changes of travel routes can be reduced. In the case where the control sections 81 and 210 are operated with the battery BA of the personal mobility vehicle 1, the power consumption of the battery BA of the personal mobility vehicle 1 is reduced, and also in the case where the control section 210 is a tablet computer or the like, the power consumption of the battery BA is reduced. This will make the rider more comfortable.

In addition, in the travel route creation system according to this embodiment, when the control sections 81 and 210 create a travel route that allows the personal mobility vehicle 1 to pass via the bump 122*a* or a slope 122*b* on the basis of the second map data 122 indicating the bump 122*a* or the slope 122*b* over which the personal mobility vehicle 1 can travel, the control sections 81 and 210 create a travel route in which the angle of access to the bump 122*a* or the slope 122*b* is be 45° or more.

In the case where the front wheels 10 or the rear wheels 20 of the personal mobility vehicle 1 are omnidirectional wheels, if the access angle, i.e., the acute angle α between the vehicle front-rear direction of the personal mobility vehicle and the extension direction of a bump, or the like is small, the personal mobility vehicle 1 readily moves in an unintended direction at the time the omnidirectional wheels access the bump. In the case where the front wheels 10 or the rear wheels 20 of the personal mobility vehicle 1 are other types of wheels, a similar phenomenon may also occur. With the above-described configuration, the control sections 81 and 210 create a travel route that causes the angle at which the personal mobility vehicle 1 enters the bump 122*a* or the slope 122*b* to be 45° or more. For this reason, it is possible to suppress unintended movement of the personal mobility vehicle 1 when the personal mobility vehicle 1 enters a bump or a slope, which makes the rider more comfortable.

Note that the access angle should preferably be 60° or more.

In this embodiment, the control sections 81 and 210 create a travel route that sets the angle at which the personal mobility vehicle 1 enters the bump 122*a* within an angle range of 85° or less.

When the angle at which the personal mobility vehicle 1 enters the bump 122*a* is 90°, the impact applied to the personal mobility vehicle 1 may be large in some cases in accordance with the specifications of the personal mobility vehicle 1, the state of the bump 122*a*, or the like. With this configuration, the angle at which the personal mobility vehicle 1 enters the bump 122*a* is 85° or less, which can make the rider more comfortable.

In this embodiment, the personal mobility vehicle 1 includes sensors having the detection areas DA which cover areas at the outer sides in the width direction of the front wheels 10, and the control sections 81 and 210 control the personal mobility vehicle 1 by using detection results of the sensors so that the angle at which the personal mobility vehicle 1 enters the bump 122*a* or the slope 122*b* is 45° or more.

When this configuration is used, the relationship between the bump 122*a* or the slope 122*b* and the front wheels 10 can be perceived on the basis of the detection results of the sensors. For this reason, the access angle at which the front wheels 10 access the bump 122*a* or the slope 122*b* can be reliably set to 45° or more.

In this embodiment, the front wheels 10 or the rear wheels 20 are omnidirectional wheels.

Unlike conventional wheels, an omnidirectional wheel may move in the width direction more than expected in some cases. Thus, the capability of reliably perceiving the relationship between the front wheels 10 or the rear wheels 20, which are omnidirectional wheels, and objects that are present in areas at the outer sides in the width direction of the front wheels 10 or the rear wheels 20 is advantageous in controlling the angle at which the front wheels 10 and the rear wheels 20 enters the objects.

The following aspects of the present invention are derived from the above disclosure.

A first aspect of the present invention is a travel route creation system which creates a travel route for a personal mobility vehicle, the travel route creation system includes a controller configured to create the travel route for the personal mobility vehicle based on first map data indicating an area in which the personal mobility vehicle can travel and second map data including information about safety during traveling or a standstill of the personal mobility vehicle.

For example, the first map data includes data on the positions and areas of sidewalks, interiors of buildings, interiors of station premises, open spaces, parks, and the like, and the second map data includes information about bumps, slopes, and the like that are present on sidewalks, in buildings, in station premises, in open spaces, in parks, and the like. In the aforementioned aspect, because the second map data having information about safety during traveling or a standstill of the personal mobility vehicle is used, a travel route is set by taking into account the safety during traveling or a standstill of the personal mobility vehicle.

In addition, it is possible to create first map data having almost all of the positions and areas of sidewalks, interiors of buildings, interiors of station premises, open spaces, parks, and the like. In addition, the positions and areas of sidewalks, interiors of buildings, interiors of station premises, open spaces, parks, and the like are not changed so often, and therefore, once the first map data is created, the update frequency thereof is not so high. On the other hand, it is difficult to create second map data including almost all information about safety during travelling or a standstill of the personal mobility vehicle. For example, it is difficult for the rider of the personal mobility vehicle to perceive, with his/her eyes in a short time period, all bumps, slopes, and the like that are present on sidewalks, in buildings, in station premises, in open spaces, in parks, and the like. In addition, the first map data has detailed shape information, position information, and the like of each element, and thus it often takes a long time to add data to the first map data. In contrast, in this aspect, it is possible to update the second map data, which has, for example, a simple data structure different from that of the first map data. Therefore, it is possible to update the second map data moment by moment, which makes it possible to set travel routes in accordance with a request from the rider of the personal mobility vehicle.

A second aspect of the present invention is a travel route creation system which creates a travel route for a personal mobility vehicle, the travel route creation system includes: a server configured to set a plurality of passing points, which are apart from one another, between a current position of the personal mobility vehicle and a destination at least based on map data indicating an area in which the personal mobility vehicle can travel, information on the current position of the personal mobility vehicle, and information on the destination; a sensor provided in the personal mobility vehicle; and a controller configured to receive information about the plurality of passing points from the server and to create travel routes between the plurality of passing points by using data obtained by the sensor so as to pass, one after another, the passing points or the vicinities thereof.

The controller creates travel routes between the plurality of passing points. In short, if a travel route up to the next passing point has been created, the personal mobility vehicle can arrive at that passing point or the vicinity thereof. More specifically, even in the case where it becomes necessary to change a travel route for the personal mobility vehicle according to the presence, motion, and the like of other objects including people and bicycles, the controller just needs to change the travel route up to the next passing point.

Therefore, power consumption due to moment-by-moment changes of travel routes can be reduced. In the case where the controller is operated with the battery of the personal mobility vehicle, the power consumption of the battery of the personal mobility vehicle is reduced, and also in the case where the controller is a tablet computer or the like, the power consumption of the battery of the tablet computer is reduced. This will make the rider more comfortable.

A third aspect of the present invention is a travel route creation system which creates a travel route for a personal mobility vehicle, the travel route creation system including a controller configured to create the travel route in which an entering angle to a bump or a slope is set within an angle range of 45° and more based on map data indicating the bump or the slope which the personal mobility vehicle can travel over, when creating the travel route for the personal mobility vehicle to pass the bump or the slope.

In the case where the front wheels or the rear wheels of the personal mobility vehicle are omnidirectional wheels, if the entering angle, i.e., the acute angle between the vehicle front-rear direction of the personal mobility vehicle and the extension direction of a bump, or the like is small, the personal mobility vehicle readily moves in an unintended direction at the time the omnidirectional wheels enters the bump. In the case where the front wheels or the rear wheels of the personal mobility vehicle are other types of wheels, a similar phenomenon may also occur. In the above-described aspect, the controller creates a travel route that sets the angle at which the personal mobility vehicle enters the bump or the slope within an angle range to be 45° and more. For this reason, it is possible to suppress unintended movement of the personal mobility vehicle when the personal mobility vehicle enters a bump or a slope, which makes the rider more comfortable.

Note that the access angle should preferably be 60° or more.

In the above-described aspect, the controller preferably creates the travel route for causing the entering angle to the bump to be 85° or less.

When the angle at which the personal mobility vehicle enters the bump is 90°, the impact applied to the personal mobility vehicle may be large in some cases in accordance with the specifications of the personal mobility vehicle, the state of the bump, or the like. With this configuration, the angle at which the personal mobility vehicle enters the bump is 85° or less, which makes the rider more comfortable.

In the above-described aspect, the personal mobility vehicle preferably includes a sensor whose detection area covers an area located outside a front wheel in a width direction, the personal mobility vehicle includes a controller configured to control the personal mobility vehicle so that an entering angle of the personal mobility vehicle to a bump or a slope is within an angle range of 45° and more, using a detection result of the sensor.

When this configuration is used, the relationship between the bump or the slope and the front wheel can be perceived on the basis of the detection result of the sensor. For this reason, the access angle at which the front wheel enters the bump or the slope can be reliably set to 45° or more.

The above aspects afford an advantage in that a rider can be made more comfortable.

The invention claimed is:

1. A system which controls a personal mobility vehicle with an autonomous driving mode, the system comprising:
one or more processors configured to create one or more travel routes on map data for the personal mobility vehicle whose front wheel or rear wheel is one of an omnidirectional wheel and a caster,
wherein the one or more processors are configured to control the personal mobility vehicle with the autonomous driving mode by using the one or more travel routes on the map data,
wherein the one or more processors are configured to create the one or more travel routes on the map data in which each entering angle to a bump or a slope on the map data is set at a minimum angle of 45° and more based on the map data indicating the bump or a direction of the slope which the personal mobility vehicle can travel over, when creating the one or more travel routes on the map data for the personal mobility vehicle to pass the bump or the slope, or configured to create the one or more travel routes in which an angle between the direction of the slope and an orientation of the personal mobility vehicle at a time when the personal mobility vehicle stops in the slope is set at a maximum angle of 45° and less.

2. The system according to claim 1, wherein the one or more processors are configured to create the one or more travel routes for the personal mobility vehicle based on first map data indicating an area in which the personal mobility vehicle can travel and second map data including information about safety during traveling or a standstill of the personal mobility vehicle,
wherein the second map data includes one of information of bumps which the personal mobility vehicle can travel over and information of the direction of the slope.

3. The system according to claim 1, further comprising a server,
wherein the server is configured to:
set passing points for avoiding foul weather, rainy weather, snowfall, or hot weather when a request to avoid the foul weather, the rainy weather, the snowfall, or the hot weather is input by an operator or a rider of the personal mobility vehicle; and
wherein the server or the one or more processors are configured to create the one or more travel routes based on the set passing points.

4. The system according to claim 1, further comprising a server,
wherein the server is configured to:
accumulate evaluation score of a people congestion level based on input by an operator or a rider of the personal mobility vehicle;
determine a travel difficulty level of a partial area which is corresponding to the evaluation score based on the accumulated evaluation score, the partial area is located in an area in which the personal mobility vehicle can travel;
set passing points referring to the map data on which the travel difficulty level is reflected; and
wherein the server or the one or more processors are configured to -create the one or more travel routes based on the set passing points.

5. The system according to claim 1, wherein the one or more processors are configured to create the one or more travel routes for causing the entering angle to the bump or the slope to be 85° or less.

* * * * *